(12) United States Patent
Carlson et al.

(10) Patent No.: US 8,227,561 B1
(45) Date of Patent: Jul. 24, 2012

(54) BISPHENOL-A REPLACEMENT MATERIALS

(75) Inventors: William B. Carlson, Seattle, WA (US); Gregory D. Phelan, Cortland, NY (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/318,098

(22) PCT Filed: May 2, 2011

(86) PCT No.: PCT/US2011/034772
§ 371 (c)(1),
(2), (4) Date: Oct. 28, 2011

(51) Int. Cl.
*C08F 118/02* (2006.01)
*C07C 50/16* (2006.01)
*C07J 9/00* (2006.01)
*C07J 5/00* (2006.01)

(52) U.S. Cl. ......... 526/319; 552/555; 552/557; 552/290

(58) Field of Classification Search .................. 526/319; 552/290, 555, 557
See application file for complete search history.

(56) References Cited

U.S. PATENT DOCUMENTS

| | | | |
|---|---|---|---|
| 3,072,485 A * | 1/1963 | Reynolds et al. | 430/195 |
| 4,717,624 A | 1/1988 | Ikenaga et al. | |
| 4,874,800 A | 10/1989 | Minamisawa et al. | |
| 2003/0003397 A1 * | 1/2003 | Hong et al. | 430/271.1 |

FOREIGN PATENT DOCUMENTS

| | | |
|---|---|---|
| GB | 1 560 453 | 2/1980 |
| GB | 1 575 964 | 10/1980 |
| JP | 10-183052 | 7/1998 |
| JP | 2008-297487 | 12/2008 |
| JP | 2009-067893 | 4/2009 |
| JP | 2010-018745 | 1/2010 |
| WO | WO-2006/045017 | 4/2006 |

OTHER PUBLICATIONS

Asplund, B. et al., "Effects of hydrolysis on a new biodegradable co-polymer," J. Biomater. Sci., 2006, vol. 17, No. 6, pp. 615-630.
Bair, H.E. et al., "Hydrolysis of polycarbonate to yield BPA," J. App. Poly. Sci., 1981, vol. 26, pp. 1777-1786.
Bair, H.E. et al., "Water sorption of polycarbonate and its effect on the polymer's dielectric behavior," Journal of Applied Physics, Oct. 1978, vol. 49, No. 10, pp. 4976-4984.
Barnes, H.M., "Coating durability on organolead-treated southern pine in exterior exposure," Journal of Coatings Technology, Apr. 1979, vol. 51, No. 651, pp. 43-45.
Blaga, A., "Effects of cycloaliphatic and alkylarylic glycols on the relations between the chemical structure and the properties of fatty acid modified isophthalic alkyd resins," Farbe and Lack, 1973, vol. 79, No. 5, pp. 413-419.
Clarke, R.L. et al., "Potential Steroid Substitutes. I. Introductory Remarks. The Synthesis of Some Dioxoperhydroanthracenes," Journal of the American Chemical Society, Apr. 10, 1959, vol. 81, pp. 5706-5710.

(Continued)

*Primary Examiner* — William Cheung
(74) *Attorney, Agent, or Firm* — Foley & Lardner LLP

(57) ABSTRACT

Polymers may include a plurality of tetradecahydroanthracene moieties. Such polymers may be used to make food or beverage containers or medical devices. Food or beverage containers or medical devices may be coated with polymers including a plurality of tetradecahydroanthracene moieties.

24 Claims, 11 Drawing Sheets

6 No. 6 atoms x 4 = 24
9 No. 7 atoms x 1 = 9
Total = 33

4 No. 6 atoms x 4 = 16
3 No. 7 atoms x 1 = 3
Total = 19

OTHER PUBLICATIONS

Ditsent, V.E., "Polarographic study of anthraquinone compounds and their tetra- and octahydro derivatives," Journal of General Chemistry, Apr. 1959, vol. 29, No. 4, pp. 1346-1350.

Eisenschiml, G., "Changes in wood oil and tung oil on prolonged storage," Paint, Oil and Chemical Review, Jan. 10, 1946, vol. 109, No. 1, pp. 16 and 18.

Farrissey, W.J. et al., "Cycloocta-1,5-dien-3-one and bicyclo(4.2.0) oct-2-en-4-one an example of valence-bond tautomerism," Tetrahedron Letters, 1964, vol. 48, pp. 3635-3640.

Fenouillot, F. et al., "Polymers from renewable 1,4:3,6-dianhydrohexitols (isosorbide, isomannide and isoidide): A review," Progress in Polymer Science, 2010, vol. 35, pp. 578-622.

Gardner, R.J. et al., "Humid aging of plastics, part II. Effect of molecular weight on mechanical properties of polycarbonate," Journal of Applied Polymer Science, 1979, vol. 24, pp. 1269-1280.

Grause, G. et al., "Pyrolytic hydrolysis of polycarbonate in the presence of earth-alkali oxides and hydroxides," Polymer Degradation and Stability, 2009, vol. 94, pp. 1119-1124.

Hill, R.K. et al., "Stereochemistry of hydroanthracenes," Journal of the American Chemical Society, 1961, vol. 83, pp. 4006-4012.

Hong, K.Z. et al., "Explaining Ductility Loss in Steam-Sterilized Polycarbonate," Med. Plast. Biomat., May/Jun. 1996, pp. 14, 16, 18, 20.

Howe, S.R. et al., "Potential exposure to bisphenol A from food-contact use of polycarbonate resins," Food Addit. Contam., 1998, vol. 15, No. 3, pp. 370-375.

International Search Report and Written Opinion for PCT/US2011/034772 mailed Jul. 18, 2011.

Kanai, T. et al., "Synthesis and characterization of novel silicone acrylate-soya alkyd resin as binder for long life exterior coatings," Progress in Organic Coatings, 2007, vol. 58, pp. 259-264.

Kang, J.H. et al., "Bisphenol A migration from cans containing coffee and caffeine," Food Addit. Contam., 2002, vol. 19, No. 9, pp. 886-890.

Katz, G. et al., "Subchronic inhalation toxicity study of a water-dispersible polyester in rats," Food Chem. Toxicol., 1997, vol. 35, pp. 1023-1030.

Kozlov, V.V. et al., "Diazotization of aminoanthraquinones," Izvestiya Vysshikh Uchebnykh Zavedenii, Khimiya i Khimicheskaya Tekhnologiya, 1959, vol. 2, No. 3, pp. 374-380.

Mercea, P., "Physicochemical processes involved in migration of bisphenol A from polycarbonate," Journal of Applied Polymer Science, 2009, vol. 112, pp. 579-593.

Mountfort, K.A. et al., "Investigations into the potential degradation of polycarbonate baby bottles during sterilization with consequent release of bisphenol A," Food Addit. Contam., 1997, vol. 14, No. 6-7, pp. 737-740.

Pryde, C.A. et al., "The Hydrolytic Stability of Some Commercially Available Polycarbonates," Polym. Eng. Sci., Apr. 1982, vol. 22, No. 6, pp. 370-375.

Pryde, C.A. et al., "Solid state hydrolysis of bisphenol-A polycarbonate. I. Effect of phenolic end groups," Journal of Applied Polymer Science, 1980, vol. 25, pp. 2573-2587.

Pu, X. et al., "Synthesis and degradation of copolymer of styrene and tung oil initiated by self-oxidization of tung oil," Linchan Huaxue Yu Gongye, Mar. 2006, vol. 26, No. 1, pp. 37-40.

Ritter, H.S., "Durability of paint films from erosion rate studies," Journal of Paint Technology, 1971, vol. 43, No. 552, pp. 74-82.

Shah, K.H. et al., "Raney Nickel Reductions—Part I," Proc. Indian. Acad. Sci., 1948, vol. 28A, pp. 142-150.

Taylor, M.S. et al., "Six bioabsorable polymers: in vitro acute toxicity of accumulated degradation products," J Appl. Biomater., 1994; 5, pp. 151-157.

Turpin, E.T., "Hydrolysis of Water Dispersible Resins," J. Paint. Technol., Mar. 1975, vol. 47, No. 602, pp. 40-46.

Wharton, P.S. et al., "trans, trans, cis-2,8,12-trans-Bicyclo[8.4.0]tetradecatriene," Journal of Organic Chemistry, 1972, vol. 37, No. 4, pp. 548-551.

Wharton, P.S. et al., "trans, trans-2,8-trans-Bicyclo[8.4.0]tetradecadiene," Journal of Organic Chemistry, 1965, vol. 30, No. 1, pp. 234-237.

* cited by examiner

6 No. 6 atoms x 4 = 24
9 No. 7 atoms x 1 =  9
Total = 33

4 No. 6 atoms x 4 = 16
3 No. 7 atoms x 1 =  3
Total = 19 cross-linked urethane resin

BISPHENOL-A REPLACEMENT MATERIALS

CROSS-REFERENCE TO RELATED APPLICATIONS

This application is a U.S. national stage application claiming the benefit of International Patent Application No. PCT/US2011/03477, filed on May 2, 2011, the entire disclosure of which is incorporated herein by reference for any and all purposes.

FIELD

The present technology relates bisphenol-A replacement materials and methods of making such materials.

BACKGROUND

The following description is provided to assist the understanding of the reader. None of the information provided or references cited is admitted to be prior art to the present invention.

4,4'-(Propane-2,2-diyl)diphenol, more commonly known as bisphenol-A (BPA), is a widely used monomer for the production of polymers. The primary use of BPA is to create polymers including epoxy resins, polyurethanes, polyacrylates (including polymethacrylates) and polycarbonates. The aromatic groups of BPA are highly rigid, leading to polymers with great mechanical strength and high glass transition temperatures.

As a result, BPA-based polymers and resins are found in a wide range of products and applications, from consumer products to medical devices. For example, BPA-based epoxy resins are used for coil and can coatings for food and beverage containers; BPA-based polycarbonates and their copolymers are used to produce food containers including baby bottles, tableware, sport drink containers; and BPA-based polymers are used in medical devices including storage devices, renal dialysis devices, cardiac surgery products, surgical instruments, and intravenous connection components. Such widespread use has made BPA among the highest production volume industrial chemicals, leading to a substantial production infrastructure for the compound.

In recent years, health concerns have arisen regarding BPA-based polymers. Such polymers are susceptible to degradation and yellowing upon exposure to light, heat, moisture, and certain chemicals. Upon degradation of the polymers, BPA and its derivatives can make its way into the contents of the food and beverage containers or medical storage devices and, subsequently, into the body. For example, BPA-containing polycarbonates have been shown to hydrolyze and release BPA monomers ((a) Mercea, P., *Journal of Applied Polymer Science* (2009), 112(2), 579; (b) Kang, Jeong-Hun; Kondo, Fusao. *Food Additives & Contaminants* (2002), 19(9), 886; (c) Howe, Susan R.; Borodinsky, Lester, *Food Additives and Contaminants* (1998), 15(3), 370; (d) Mountfort, Katrina A.; Kelly, Janet; Jickells, Sue M.; Castle, Laurence, *Food Additives and Contaminants* (1997), 14(6-7), 737). BPA is considered to be an endocrine disruptor and has been suggested to cause or contribute to birth defects, miscarriages, neurological problems, menstrual cycle disruptions, testicular disruption, and breast growth in males among other effects. In view of these concerns, various governmental authorities have become more restrictive in regulating the amounts of BPA in certain products. Bans on the use of BPA in certain products, such as baby bottles, have been instituted in some countries.

SUMMARY

As a replacement for BPA-based polymers, the present technology provides polymers containing tetradecahydroanthracene (TDHA) moieties and substituted derivatives of TDHA moieties. Polymers and compositions containing such moieties can be inexpensive, easy to make by using current infrastructure, and have low toxicity. TDHA-containing polymers and compositions exhibit hydrolytic stability, stability towards UV light, heat resistance, and/or chemical resistance. Finally, TDHA-containing polymers and compositions may be formulated for impact resistance, high flexibility, and/or excellent adhesion. Thus, the TDHA-containing polymers and compositions may be used in the manufacture of food and beverage containers, medical devices, and in coatings for the same.

In accordance with one aspect, a polymer is provided which includes at least one repeating unit, where the repeating unit includes a TDHA moiety. In some embodiments, the polymer including the repeating unit which includes a TDHA moiety is an epoxy, a polyol, an alkyd, a polycarbonate, a polyester, or a polyurethane. In some embodiments, the polymer is a random copolymer, a block copolymer, or a graft copolymer.

In some embodiments, the TDHA moiety is represented by Formula I:

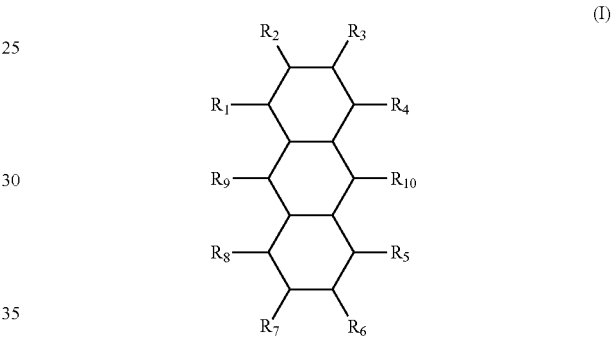

(I)

where $R_1$-$R_{10}$ are each independently hydrogen, halogen, alkyl, alkenyl, aryl, alkoxy, amino, protected amino, amido, hydroxyl, protected hydroxyl, phosphino, thio or an oxo group; where at least two of $R_1$-$R_{10}$ are oxo groups; and where the TDHA moiety is attached to the polymer backbone through the oxo groups. In some embodiments, $R_1$-$R_4$ and $R_5$-$R_{10}$ are hydrogen and $R_9$-$R_{10}$ are oxo groups.

For clarity, the TDHA moiety represented by Formula I should not be interpreted to mean that such a moiety is bonded to itself (i.e., as a polymer repeat unit), but rather that the moiety represented by Formula I is present within the backbone of the polymer. As used herein, the term "backbone" refers to the linear chain of a polymer to which all other chains may be regarded as being pendant. Moieties represented by Formulas II, IV, VII, VIII, IX, X, and XI shall be interpreted similarly.

In other embodiments, a polymer is provided including a plurality of TDHA moieties, the polymer represented by Formula II:

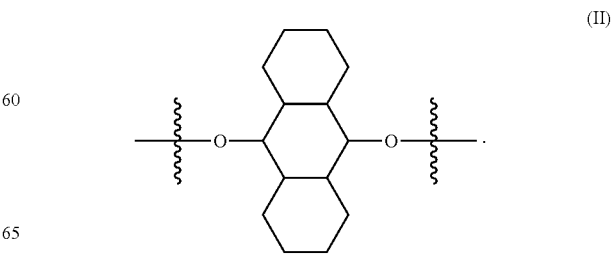

(II)

In other aspects, an epoxy polymer is provided, the epoxy polymer represented by Formula III:

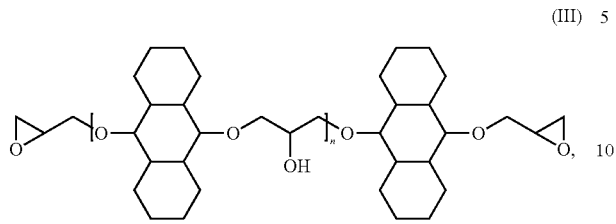

(III)

where n is an integer from 1 to 1,000,000.

In other aspects, a polyol polymer is provided, the polyol polymer represented by Formula IV:

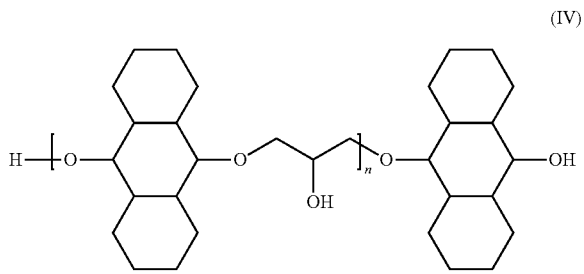

(IV)

where n is an integer from 1 to 1,000,000.

In other aspects, an alkyd polymer is provided, the alkyd polymer represented by Formula V:

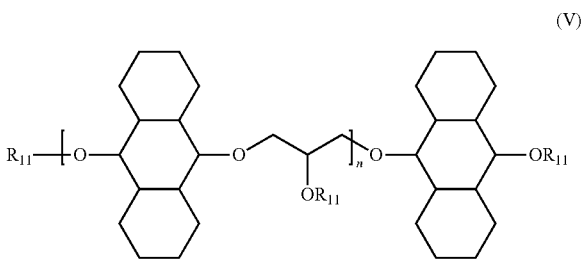

(V)

where $R_{11}$ is independently at each occurrence a fatty acid such as lauric acid, stearic acid, palmitic acid, oleic acid, linoleic acid, linolenic acid, ricinolenic acid, eleostearic acid, eicosapentaenoic acid, docosahexaenoic acid, stearidonic acid, eicosatrienoic acid, eicosatetraenoic acid, docosapentaenoic acid, clupanodonic acid, tetracosapentaenoic acid, and tetracosahexaenoic acid; and where n is an integer from 1 to 1,000,000.

In another embodiment, a polymer is provided which includes at least one repeating unit, where the repeating unit includes a TDHA moiety and the polymer further includes at least one graft side chain, where the graft side chain includes a polyacrylate, a polyolefin, or a copolymer thereof.

In other aspects, a method of preparing a first polymer which includes a plurality of TDHA moieties is provided by hydrogenating a second polymer which includes a plurality of anthracene moieties.

In another aspect, an article made of a polymer is provided, where the polymer includes at least one repeating unit, where the repeating unit includes a TDHA moiety, and the article is a food container, a beverage container, or a medical device.

In another aspect, a coating made of a polymer which includes at least one repeating unit is provided, where the repeating unit includes a TDHA moiety.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

Figure 1:
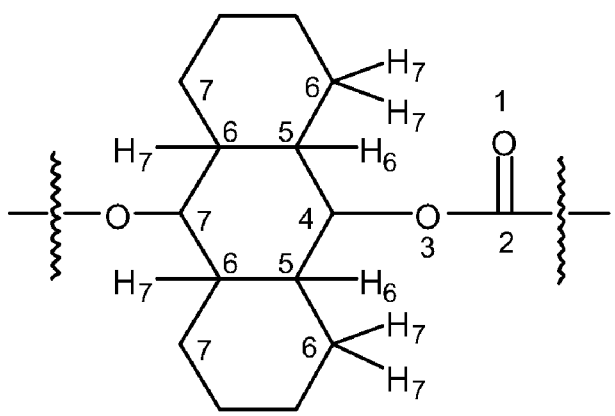
FIG. 1 shows the calculations of the steric factor for hydrolytic stability of TDHA- and BPA-based polymers.
Figure 1:
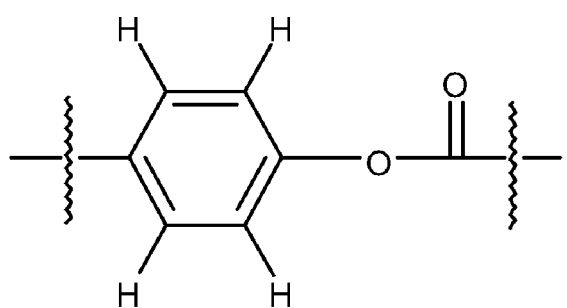

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present technology is described herein using several definitions, as set forth throughout the specification.

As used herein, unless otherwise stated, the singular forms "a," "an," and "the" include plural reference. Thus, for example, a reference to "a cell" includes a plurality of cells, and a reference to "a molecule" is a reference to one or more molecules.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Alkyl groups include straight chain and branched chain alkyl groups having 1 to 24 carbons or the number of carbons indicated herein. In some embodiments, an alkyl group has from 1 to 16 carbon atoms, from 1 to 12 carbons, from 1 to 8 carbons or, in some embodiments, from 1 to 6, or 1, 2, 3, 4 or 5 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. In some embodiments, the alkyl groups may be substituted alkyl groups.

Cycloalkyl groups are cyclic alkyl groups having from 3 to 10 carbon atoms. In some embodiments, the cycloalkyl group has 3 to 7 ring members, whereas in other embodiments the number of ring carbon atoms range from 3 to 5, 3 to 6, or 5, 6 or 7. Cycloalkyl groups further include monocyclic, bicyclic and polycyclic ring systems. Monocyclic groups include, e.g., cyclopropyl, cyclobutyl, cyclopentyl, cyclohexyl, and cycloheptyl groups. Bicyclic and polycyclic cycloalkyl groups include bridged or fused rings, such as, but not limited to, bicyclo[3.2.1]octane, decalinyl, and the like. Cycloalkyl groups include rings that are substituted with straight or branched chain alkyl groups as defined above. In some embodiments, the cycloalkyl groups are substituted cycloalkyl groups. Representative substituted alkenyl groups may be mono-substituted or substituted more than once, such as, but not limited to, mono-, di- or tri-substituted with substituents such as those listed above. Representative substituted alkyl groups may be mono-substituted or substituted more than once, such as, but not limited to, mono-, di- or tri-substituted with substituents such as those listed above.

Alkenyl groups include straight and branched chain alkyl groups as defined above, except that at least one double bond exists between two carbon atoms. Thus, alkenyl groups have from 2 to 24 carbon atoms, and typically from 2 to 10 carbons or, in some embodiments, from 2 to 8, 2 to 6, or 2 to 4 carbon atoms. Examples include, but are not limited to vinyl, allyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, among others. Representative substituted alkenyl groups may be mono-substituted or substituted more than once, such as, but not limited to, mono-, di- or tri-substituted with substituents such as those listed above.

Alkynyl groups include straight and branched chain alkyl groups as defined above, except that at least one triple bond exists between two carbon atoms. Thus, alkynyl groups have from 2 to 12 carbon atoms, and typically from 2 to 10 carbons or, in some embodiments, from 2 to 8, 2 to 6, or 2 to 4 carbon atoms. Examples include, but are not limited to —C≡CH, —CH═CCH$_3$, —CH$_2$═C═CH, —CH(CH$_3$)C≡CH, —CH$_2$C≡CCH$_3$, —CH(CH$_2$CH$_3$)C≡CH, among others. Representative substituted alkynyl groups may be mono-substituted or substituted more than once, such as, but not limited to, mono-, di- or tri-substituted with substituents such as those listed above.

Aryl groups are cyclic aromatic hydrocarbons of 6 to 14 carbons that do not contain heteroatoms. Aryl groups herein include monocyclic, bicyclic and tricyclic ring systems. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain from 6 to 12 or even 6 to 10 carbon atoms in the ring portions of the groups. In some embodiments, the aryl groups are phenyl or naphthyl. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halogen groups, bonded to one of the ring members. Rather, groups such as tolyl are referred to as substituted aryl groups. Representative substituted aryl groups may be monosubstituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups. Representative substituted aralkyl groups may be substituted one or more times with substituents such as those listed above.

Alkoxy groups are hydroxyl groups (—OH) in which the bond to the hydrogen atom is replaced by a bond to a carbon atom of an alkyl group as defined above. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Representative substituted alkoxy groups may be substituted one or more times with substituents such as those listed above.

The terms "aryloxy" and "arylalkoxy" refer to, respectively, a substituted or unsubstituted aryl group bonded to an oxygen atom and a substituted or unsubstituted aralkyl group bonded to the oxygen atom at the alkyl. Examples include but are not limited to phenoxy, naphthyloxy, and benzyloxy. Representative substituted aryloxy and arylalkoxy groups may be substituted one or more times with substituents such as those listed above.

The terms "alkylene," "cycloalkylene," "heteroalkylene," "alkenylene," "alkynylene," and "arylene" alone or as part of another substituent means a divalent radical derived from an alkyl, cycloalkyl, heteroalkyl, alkenyl, alkynyl, or aryl group, respectively, as exemplified by —CH$_2$CH$_2$CH$_2$CH$_2$—, phenylene (i.e., —C$_6$H$_4$—), naphthalene (i.e., —C$_{10}$H$_6$—), —CH$_2$—CH$_2$—S—CH$_2$CH$_2$— and —CH$_2$—S—CH$_2$—CH$_2$—NH—CH$_2$—. For alkylene, cycloalkylene, heteroalkylene, alkenylene, alkynylene, and arylene linking groups, no orientation of the linking group is implied. For heteroalkylene groups, heteroatoms can also occupy either or both of the chain termini. Heteroalkylene groups include heterocycloalkylene groups.

The term "ester" as used herein refers to —COOR groups, where R is a substituted or unsubstituted alkyl, cycloalkyl, alkenyl, alkynyl, aryl, or aralkyl group as defined herein.

The term "amine" (or "amino") as used herein refers to —NHR and —NRR' groups, wherein R, and R' are independently hydrogen, or a substituted or unsubstituted alkyl, alkenyl, alkynyl, cycloalkyl, aryl or aralkyl group as defined herein. Examples of amino groups include —NH$_2$, methylamino, dimethylamino, ethylamino, diethylamino, propylamino, isopropylamino, phenylamino, benzylamino, and the like.

The term "protected amine" (or "protected amino") refers to amine (or amino) groups in which one or more bonds to hydrogen have been replaced by a protecting group commonly known in the art. Examples of protected amine groups include: —NHBoc, —NHFmoc, —NHCbz, —NHC(O)CF$_3$, —NHC(O)CH₃, —NHBn, —NHBz, —NHTBS, —NHTr, —NPhth, —NHTs, —NHTES, —NHAlloc, —NHPMP, and the like.

The term "thiol" refers to —SH groups, while sulfides include —SR groups. R is a substituted or unsubstituted alkyl, cycloalkyl, alkenyl, alkynyl, aryl or aralkyl group as defined herein.

The term "hydroxyl" refers to —OH groups.

The term "protected hydroxyl" refers to hydroxyl groups in which the bond to hydrogen has been replaced by a protecting group commonly known in the art. Examples of protected hydroxyl groups include: —OTMS, —OTBS, —OTBDPS, —OAc, —OTHP, —OBz, —OBn, —OPMB, —OAlloc, and the like.

The term "oxo" refers to a divalent oxygen group. While the term includes doubly bonded oxygen, such as that found in a carbonyl group, as used herein, the term oxo explicitly includes singly bonded oxygen of the form —O— which is part of a polymer backbone. Thus, an oxo group may be part of an ether linkage (—O—), an ester linkage (—O—C(O)—), a carbonate linkage (—O—C(O)O—), a carbamate linkage (—O—C(O)NH— or —O—C(O)NR—), and the like.

The term "phosphino" (or "phosphine") as used herein refers to —PRR', wherein R and R' are independently selected from substituted or unsubstituted alkyl, cycloalkyl, alkenyl, alkynyl, aryl or aralkyl groups as defined herein.

The term "heteroalkyl," by itself or in combination with another term, means, unless otherwise stated, a stable, saturated or unsaturated, straight, branched chain, or cyclic hydrocarbon radical, or combinations thereof, consisting of the stated number of carbon atoms and from one to three heteroatoms selected from the group consisting of O, N, Si, and S, and wherein the nitrogen and sulfur atoms may optionally be oxidized and the nitrogen heteroatom(s) may optionally be quaternized. The heteroatom(s) O, N and S may be placed at any interior position of the heteroalkyl group. The heteroatom Si may be placed at any position of the heteroalkyl group, including the position at which the alkyl group is attached to the remainder of the molecule. Examples include —CH₂—CH₂—O—CH₃, —CH₂—CH₂—NH—CH₃, —CH₂—CH₂—N(CH₃)—CH₃, —CH₂—S—CH₂—CH₃, —CH₂—CH₂—S(O)—CH₃, —CH₂—CH₂—S(O)₂—CH₃, —CH=CH—O—CH₃, —Si(CH₃)₃, —CH₂—CH=N—OCH₃, and —CH=CH—N(CH₃)—CH₃. Up to two heteroatoms may be consecutive, such as in —CH₂—NH—O—CH₃ and —CH₂—O—Si(CH₃)₃. Explicitly included within the term "heteroalkyl" are those radicals that could also be described as "heteroalkylene", and "cycloheteroalkyl" (i.e., containing a cyclic group in which at least one ring member is a heteroatom). The term "heteroalkyl" also explicitly includes unsaturated groups (i.e., heteroalkenyls and heteroalkynyls).

"Substituted" refers to a chemical group as described herein that further includes one or more substituents, such as lower alkyl (including substituted lower alkyl such as haloalkyl, hydroxyalkyl, aminoalkyl), aryl (including substituted aryl), acyl, halogen, hydroxy, amino, alkoxy, alkylamino, acylamino, thioamido, acyloxy, aryloxy, aryloxyalkyl, carboxy, thiol, sulfide, sulfonyl, oxo, both saturated and unsaturated cyclic hydrocarbons (e.g., cycloalkyl, cycloalkenyl), cycloheteroalkyls and the like. These groups may be attached to any carbon or substituent of the alkyl, alkenyl, alkynyl, aryl, cycloheteroalkyl, alkylene, alkenylene, alkynylene, arylene, hetero moieties. Additionally, the substituents may be pendent from, or integral to, the carbon chain itself.

The present technology provides tetradecahydroanthracene (TDHA)-based polymers as a substitute for BPA-based polymers in consumer products and medical applications. TDHA-based polymers may be prepared by hydrogenation through at least two representative methods. One method is to hydrogenate anthracene-based monomers to form TDHA-based monomers, which can then be polymerized into TDHA-based polymers. For example, anthracene-9,10-diol may be hydrogenated to provide TDHA-9,10-diol which may be used directly as a monomer, such as in the preparation of polycarbonates. The anthracene-based monomer may be hydrogenated and further functionalized prior to polymerization. For example, TDHA-9,10-diol may be reacted with epichlorohydrin to prepare the epoxy-containing compound TDHA-9,10-diol diglycidyl ether. This epoxy containing-compound may then be cured, i.e., polymerized with an amine. Hydrogenation of anthracene-based monomers may be carried out with hydrogen and a transition metal catalyst such as Ni, Pt, or Pd. An alternative method to prepare TDHA-based polymers is to polymerize anthracene-based monomers into anthracene-based polymers, followed by hydrogenation with or without a catalyst. Representative catalysts include but are not limited to platinum, palladium, rhodium, ruthenium, and nickel based catalysts such as but not limited to Raney nickel and Urushibara nickel. The appropriate methods may be selected taking into account the cost effectiveness and desired structure of the final product(s).

TDHA-based polymers include at least one repeating unit that is a TDHA-containing moiety. As used herein, the hydrogenated anthracene-containing moieties are derived from both TDHA monomers and the hydrogenated products of substituted and unsubstituted anthracene-based polymers. Substituted anthracene is anthracene in which one or more hydrogen atoms (e.g., 1, 2, 3, 4, 5, 6, 7, 8, 9, or 10 hydrogens) have been replaced with a non-hydrogen group. In some embodiments, the substituents are halogen (e.g., F, Cl, Br, and I), unsubstituted alkyl, cycloalkyl, alkenyl, cycloalkenyl, alkynyl, aryl, aralkyl, alkoxy, amino (including alkylamines and arylamines), protected amino, amido, hydroxyl, protected hydroxyl, phosphino, thio, or oxo groups. In some embodiments, the TDHA moiety is represented by Formula I:

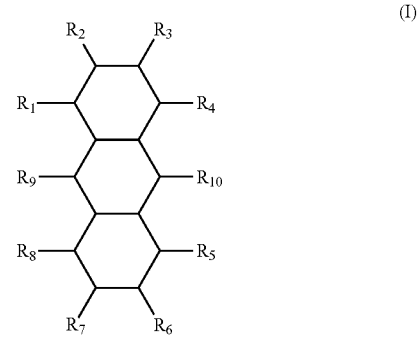

(I)

where $R_1$-$R_{10}$ are each independently hydrogen, halogen, alkyl, alkenyl, aryl, alkoxy, amino, protected amino, amido, hydroxyl, protected hydroxyl, phosphino, thio or an oxo group; where at least two of $R_1$-$R_{10}$ are oxo groups; and where the TDHA moiety is attached to the polymer backbone through the oxo groups.

In some embodiments, at least three of $R_1$-$R_{10}$ are oxos groups. In other embodiments, two of $R_1$-$R_{10}$ are oxo groups. In other embodiments, one, two, three, four, five, six, or seven of $R_1$-$R_{10}$ are hydrogen. In other embodiments, $R_9$ and $R_{10}$ are oxo groups, i.e., the TDHA moiety is a tetradecahydroanthracene-9,10-dioxo moiety. In another embodiment, $R_1$-$R_8$ are hydrogen and $R_9$ and $R_{10}$ are oxo groups.

In some embodiments, other structural isomers of TDHA and related compounds are included. For example, instead of the linear arrangement of the three rings, they may be arranged according to the ring structure of phenanthrene. In such embodiment, the compound is a hydrogenated phenanthrene with two or more hydroxyl moieties (or hydroxyl containing moieties). Similarly, related compounds to TDHA such as a hydrogenated tetracene with two or more hydroxyl moieties (or hydroxyl containing moieties), or a hydrogenated pentacene with two or more hydroxyl moieties (or hydroxyl containing moieties) are included. It would be obvious to one skilled in the art that various polymer types for BPA replacement coatings could be produced with these structural units that are related to anthracene.

The TDHA-based polymer may include a plurality of TDHA moieties, represented by Formula II:

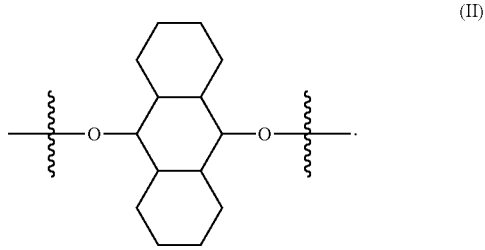

(II)

The above moiety may be incorporated into a variety of polymer classes, including, but not limited to: epoxies, polyols, alkyd resins, polycarbonates, polyesters, polyurethanes. In some embodiments, the moiety is incorporated in to a polymer by polymerization or functionalization of TDHA-9,10-diol. The TDHA-based polymer may include a plurality of TDHA moieties represented by Formula VI:

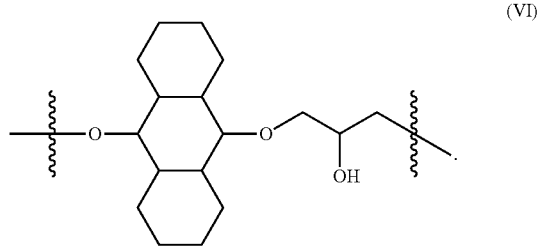

(VI)

The TDHA-moieties indicated by Formula VI may be present in a variety of polymer classes, including epoxies and polyols.

TDHA-based polymers are generally expected to display low toxicity. While not wishing to be bound by any particular theory, it is believed that the low toxicity of TDHA-based polymers is due to the lower toxicity of TDHA-based monomers, such as TDHA-9,10-diol. BPA is an aromatic system which includes phenolic hydroxyl groups. Unlike aliphatic alcohols such as TDHA-9,10-diol, phenolic alcohols are not readily oxidized to carboxylic acids in living systems, and as such are not readily excreted. Additionally, phenols are much more acidic than aliphatic alcohols: the pKa for BPA is ~9.6, while the pKa for cyclohexanol is ~17. The conjugate base to phenol, i.e., the phenolate anion, is highly nucleophilic and may attack various proteins or other genetic materials in the body. Furthermore, electron-rich phenolic compounds are prone to oxidation in living systems, generating highly toxic epoxide intermediates. Not only is aliphatic TDHA-9,10-diol less likely to display toxicological issues such as endocrine disruption in comparison to BPA, polymers derived from TDHA-9,10-diol are more hydrolytically stable polymers which will not leach monomer units into aqueous environments.

Hydrolytic stability is an important property for interior can coatings as the polymers are subject to aqueous environments at elevated temperatures for extended amounts of time. For example, polycarbonates derived from BPA may leach BPA monomer upon exposure to heat and/or water (e.g., steam). Not only does such leaching negatively impact the performance properties of the polycarbonate, but a toxic monomer is ultimately leached into the environment. The hydrolytic stability of a polymer can be estimated by Newman's "rule of six" steric factor (Equation 1).

Steric Factor=4(# of atoms in the 6-position)+(# of atoms in the 7-position)    Equation 1

The higher the steric factor, the more hydrolytically stable the polymer would expect to be. FIG. 1 shows the calculation for TDHA- and BPA-containing polycarbonates. The Newman calculation in FIG. 1 predicts that TDHA-based polymers would be more hydrolytically stable than BPA-based polymers. However, cycloaliphatics such as TDHA are actually more resistant to hydrolysis than what the Newman calculation suggests (Turpin, E. T. (1975) *J. Paint. Technol.* 47(602), 40). Thus, polymers based upon cycloaliphatics would leach less monomer. Therefore, toxicity of polymers based upon cycloaliphatics such as TDHA is reduced by lowering the amount of monomer contaminates and reduced toxicity in the monomers themselves. Thus, TDHA-based polymers are well suited for applications in food and beverage materials, such as containers and coatings. A variety of TDHA-based polymers may be prepared, including epoxy, polyol, alkyd, polycarbonate, polyester, and polyurethane polymers.

Figure 2:
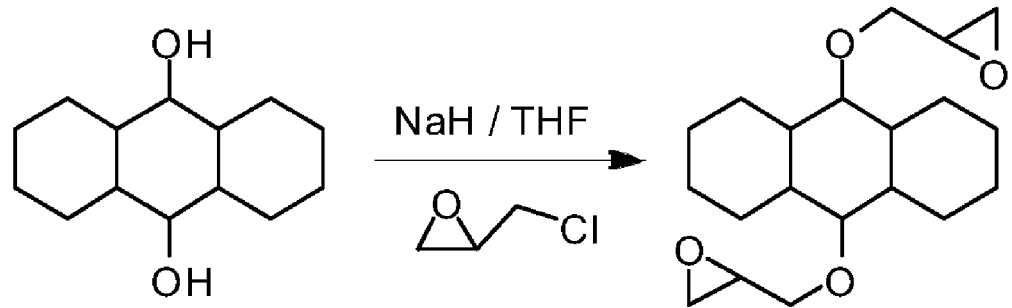
FIG. 2 is a schematic illustration of the synthesis of TDHA-9,10-diol diglycidyl ether.
Figure 3:
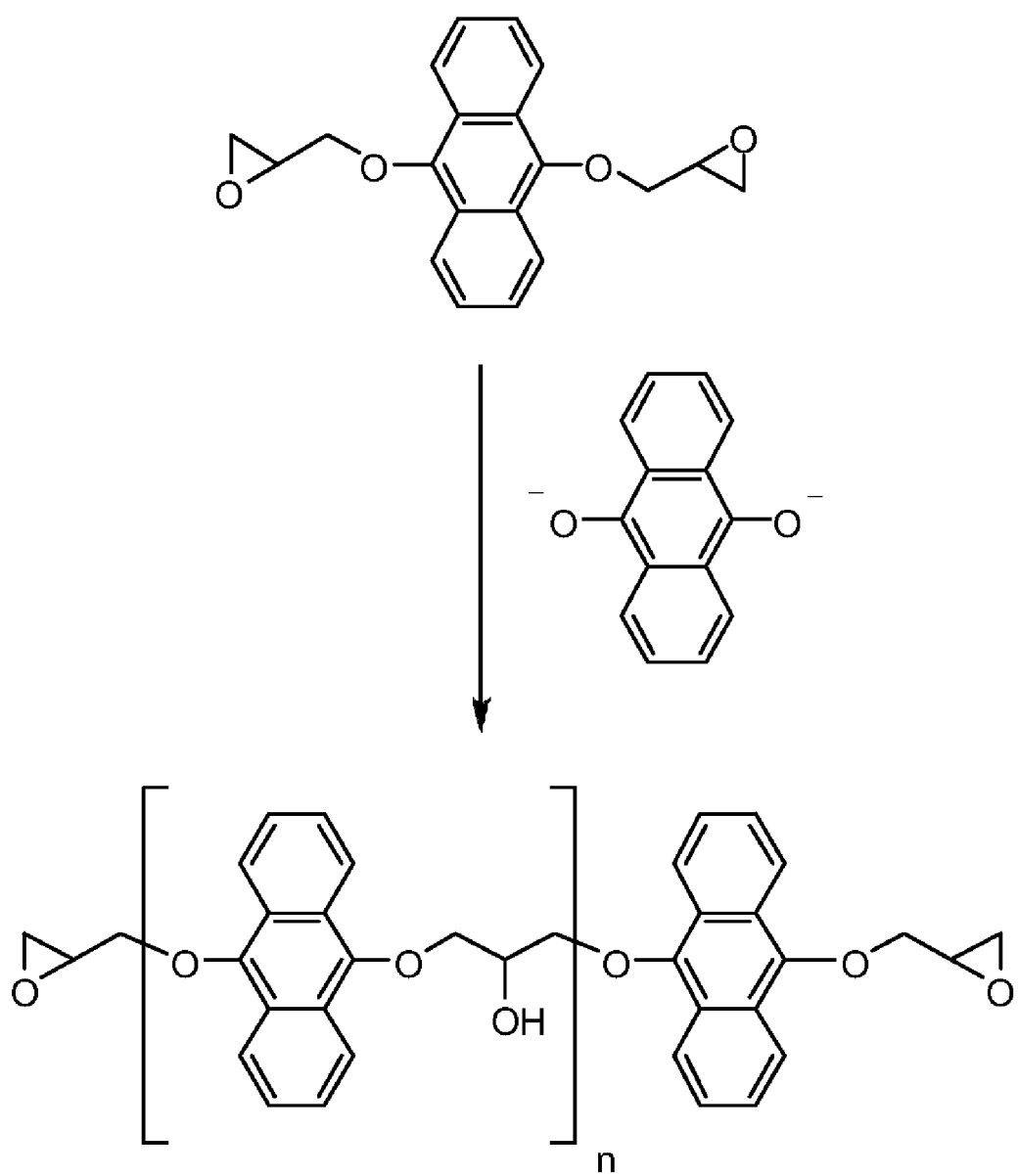
FIG. 3 is a schematic illustration of the synthesis of an anthracene-9,10-diol-derived epoxy.
Figure 4:
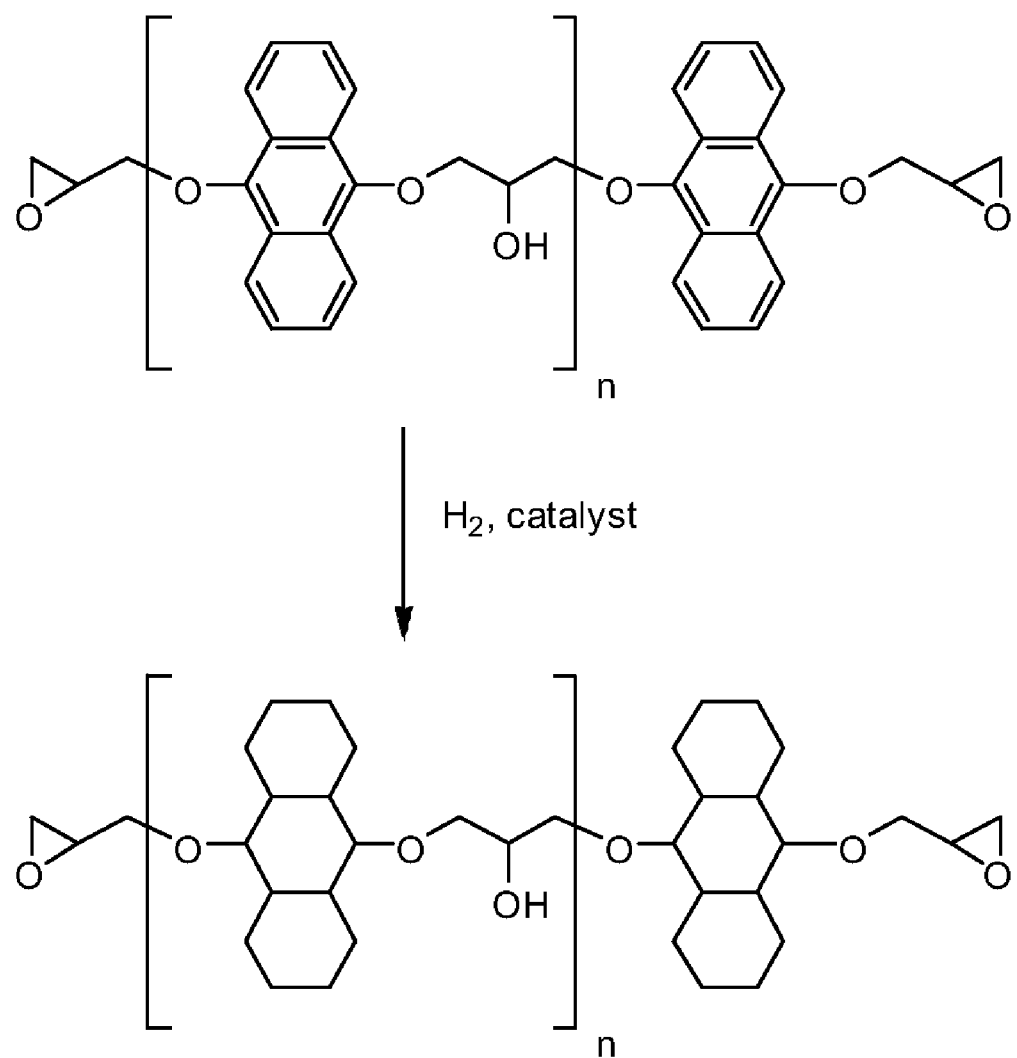
FIG. 4 is a schematic illustration showing hydrogenation of the anthracene-9,10-diol-derived epoxy prepared in FIG. 3.

Epoxy polymers may be prepared analogously to BPA-containing epoxy resins. For example, low molecular weight epoxies may be prepared by the reaction of TDHA-9,10-diol with epichlorohydrin (FIG. 2). Higher molecular weight epoxy TDHA-based polymers and resins may also be synthesized by hydrogenation of glycidyl ether-capped anthracene-containing epoxy resins (FIGS. 3 and 4). In one embodiment, the epoxides are represented by Formula III:

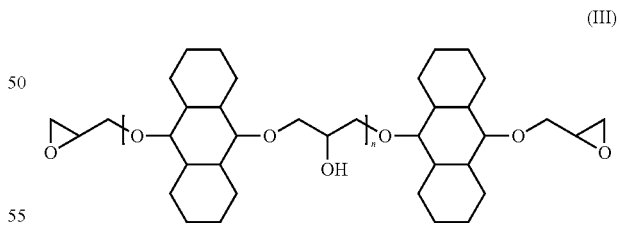

(III)

where n is an integer from 1 to 1,000,000.

Like BPA-containing counterparts, the present epoxy resins may be cross-linked through the epoxy groups using "hardeners" known in the art (e.g., triethylene tetramine). Representative functional groups of cross-linking agents that can react with epoxy groups included amines (including di-, tri-, tetra-, and other polyamines), amides, mercaptans, and alcohols (including di-, tri-, tetra- and other polyalcohols).

In another aspect, polyols which include TDHA-moieties are provided. Some such polyols may be represented by Formula IV:

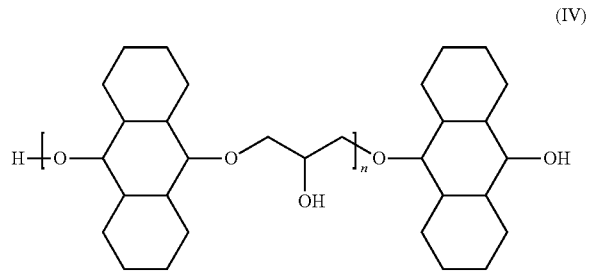

(IV)

where n is an integer from 1 to 1,000,000.

Figure 5:
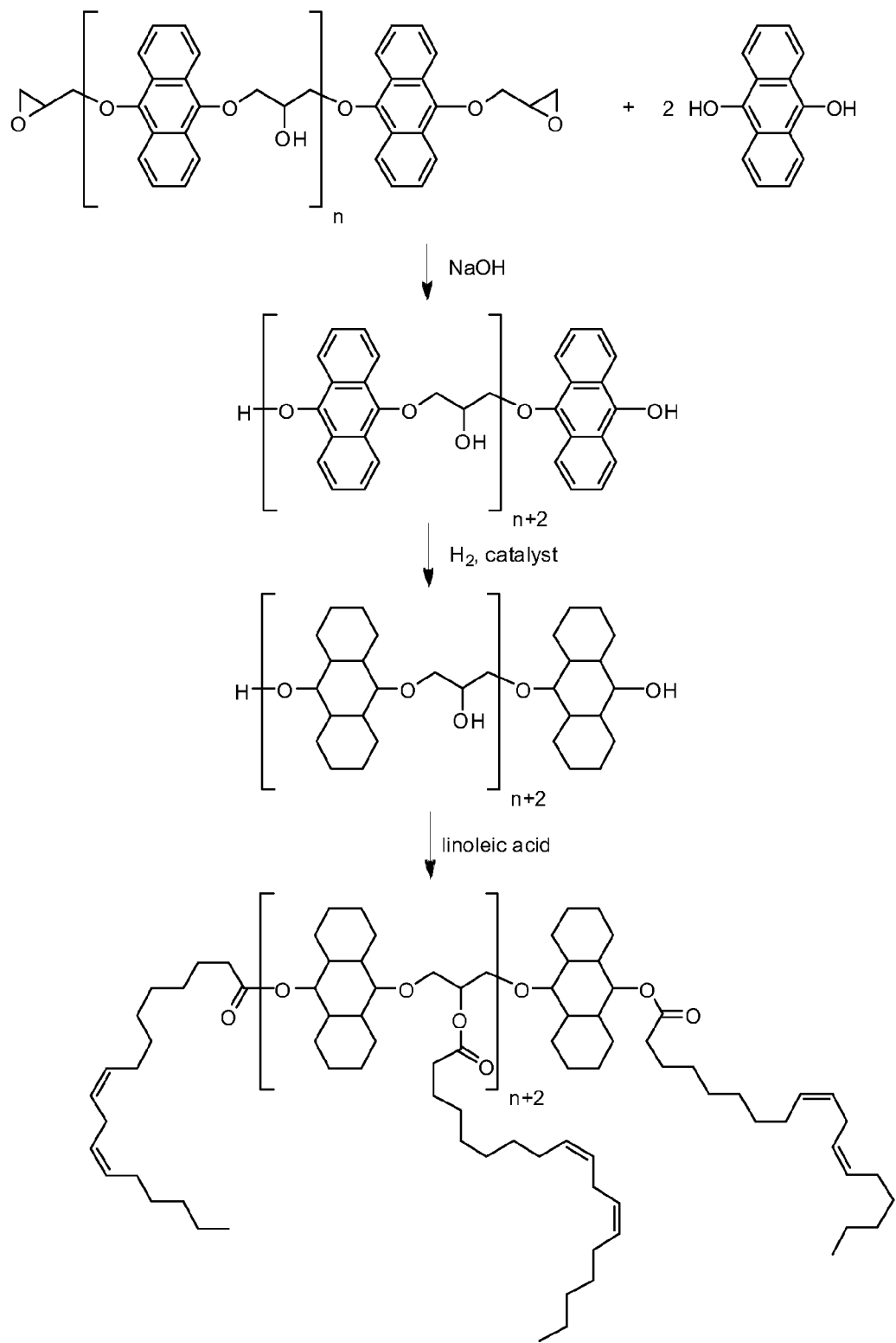
FIG. 5 is a schematic illustration of the synthesis of an alkyd resin including TDHA moieties, prepared through an intermediate TDHA-containing polyol.

Such polyols may readily be prepared through end-capping of TDHA-based epoxies (e.g., such as those shown in FIG. 4) with TDHA-9,10-diol under basic conditions or via hydrogenation of anthracene-containing polyols (e.g., such as those shown in FIG. 5).

The polyols may also be used to prepare alkyd resins. Because of their exceptional durability, alkyd resins have a variety of applications, such as for use as coating materials in the canning industry. Alkyds are prepared from the esterification of polyols with fatty acids. The fatty acids may be derived from natural oils such as tall oil, linseed oil, soybean oil, coconut oil, castor oil, sunflower oil, safflower oil, and tung oil. Depending on the oil type and composition, the saturated fatty acid contents vary in the range of 2.0 to 95.0 wt %, whereas the unsaturated fatty acid contents vary from 10.0 to 98 wt %. In some embodiments, the various oils contain fatty acids having from 8 to 24 carbons, 10 to 20 carbons, or 12 to 18 carbons in their carbon chains. In some embodiments, the oils may contain fatty acids with a $C_8$, $C_{10}$, $C_{14}$, $C_{16}$, and/or $C_{18}$ carbon chain. In an illustrative embodiment shown in the fatty acid in the oil is unsaturated and is linoleic acid (FIG. 5). The fatty acid may be a saturated fatty acid such as lauric acid, stearic acid, palmitic acid, or a mixture of two or more thereof. The fatty acid may also be an unsaturated fatty acid such as oleic acid, linoleic acid, linolenic acid, ricinolenic acid, eleostearic acid, eicosapentaenoic acid, docosahexaenoic acid, stearidonic acid, eicosatrienoic acid, eicosatetraenoic acid, docosapentaenoic acid, clupanodonic acid, tetracosapentaenoic acid, tetracosahexaenoic acid or mixtures of two or more thereof. In some embodiments, mixtures of unsaturated and saturated fatty acids may be used. Drying agents (often metal complexes based upon cobalt, zirconium, zinc, calcium, and iron compounds), may be also added to alkyd resin. The selection of a given drying agent will depend upon the oil chosen to prepare the alkyd resin.

Thus, in one aspect, an alkyd resin is provided which includes an esterified polyol backbone which contains a plurality of TDHA moieties and a plurality of fatty acid side chains attached to the esterified polyol backbone through ester linkages. In another embodiment, alkyds are provided represented by Formula V:

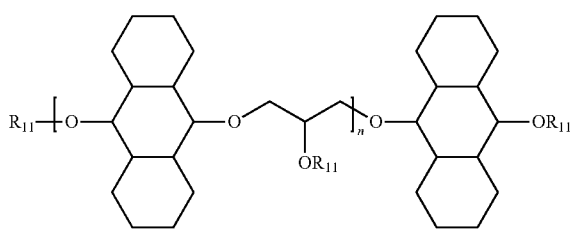

(V)

where $R_{11}$ may be independently at each occurrence a fatty acid such as lauric acid, stearic acid, palmitic acid, oleic acid, linoleic acid, linolenic acid, ricinolenic acid, eleostearic acid, eicosapentaenoic acid, docosahexaenoic acid, stearidonic acid, eicosatrienoic acid, eicosatetraenoic acid, docosapentaenoic acid, clupanodonic acid, tetracosapentaenoic acid, tetracosahexaenoic acid and the like; and where n is an integer from 1 to 1,000,000.

Polycarbonate polymers are also provided. In some embodiments, the TDHA-based polymer includes a plurality of TDHA moieties, represented by Formula VII:

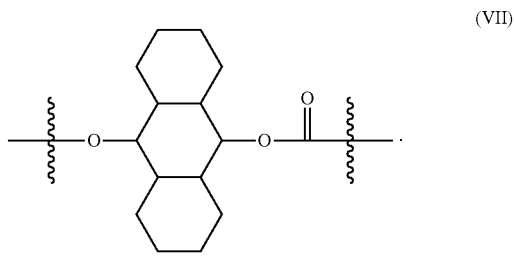

(VII)

Figure 8:
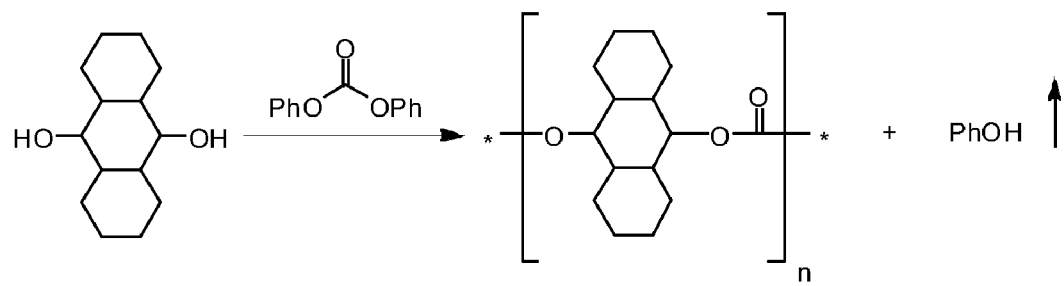
FIG. 8 is a schematic illustration of the synthesis of a polycarbonate from TDHA-9,10-diol and diphenyl carbonate monomers.

Thus, Formula VII includes not only polycarbonates, but polyesters, polyurethanes, polycarbonates, and other polymer classes that will be appreciated by those skilled in the art. Polycarbonates are generally known for good optical, thermal, and mechanical properties. Plasticizers are often added to polycarbonates, such BPA derived polycarbonates, to impart flexibility and shock resistance. BPA polycarbonates find widespread applications, such as for use in bullet-proof glass and water bottles. Unlike BPA-based polycarbonates which are known to leach toxic BPA via hydrolysis, polycarbonates derived from TDHA-9,10-diol are much less prone to hydrolyze and/or leach TDHA-9,10-diol. Polycarbonates derived from TDHA-9,10-diol may be prepared via reaction with carbonate reagent, such as diphenyl carbonate (FIG. 8). Other diol monomers may be used in addition to TDHA-9,10-diol, such that a random or block copolymer polycarbonate is formed. For example, inclusion of 1,4-cyclohexanedimethanol may be added to the reaction indicated in FIG. 8. to provide poly(TDHA-9,10-diol-co-1,4-cyclohexanedimethanol)carbonate. Such aliphatic polycarbonates are typically more flexible than the corresponding aromatic counterparts and thus the need for plasticizers may be minimized or completely eliminated. In one embodiment, the polycarbonate is represented by Formula XII:

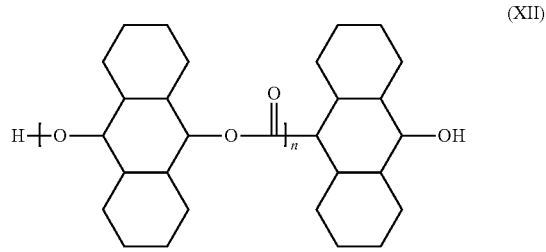

(XII)

where n is an integer from 1 to 1,000,000.

Polyesters may be prepared generally by the reaction of a diol with a dicarboxylic acid (or derivative thereof, such as a dialkyl dicarboxylate or a diacid halide). Polyesters are generally known to provide glossy materials; as such, they have found widespread use as coating materials in the automotive industry. Polyesters have also found use in the soft-drink container industry, baby bottle manufacturing, and textile manufacturing. In some embodiments, the TDHA-based polyesters include a plurality of TDHA moieties, represented Formula VIII:

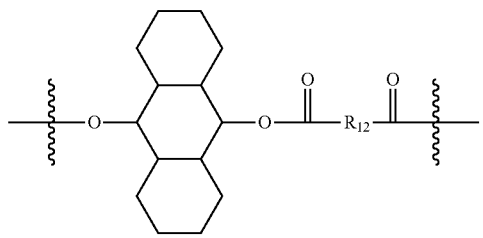

(VIII)

where $R_{12}$ includes, but is not limited to substituted or unsubstituted: alkylene, heteroalkylene, cycloalkylene, or arylene groups.

Figure 9:
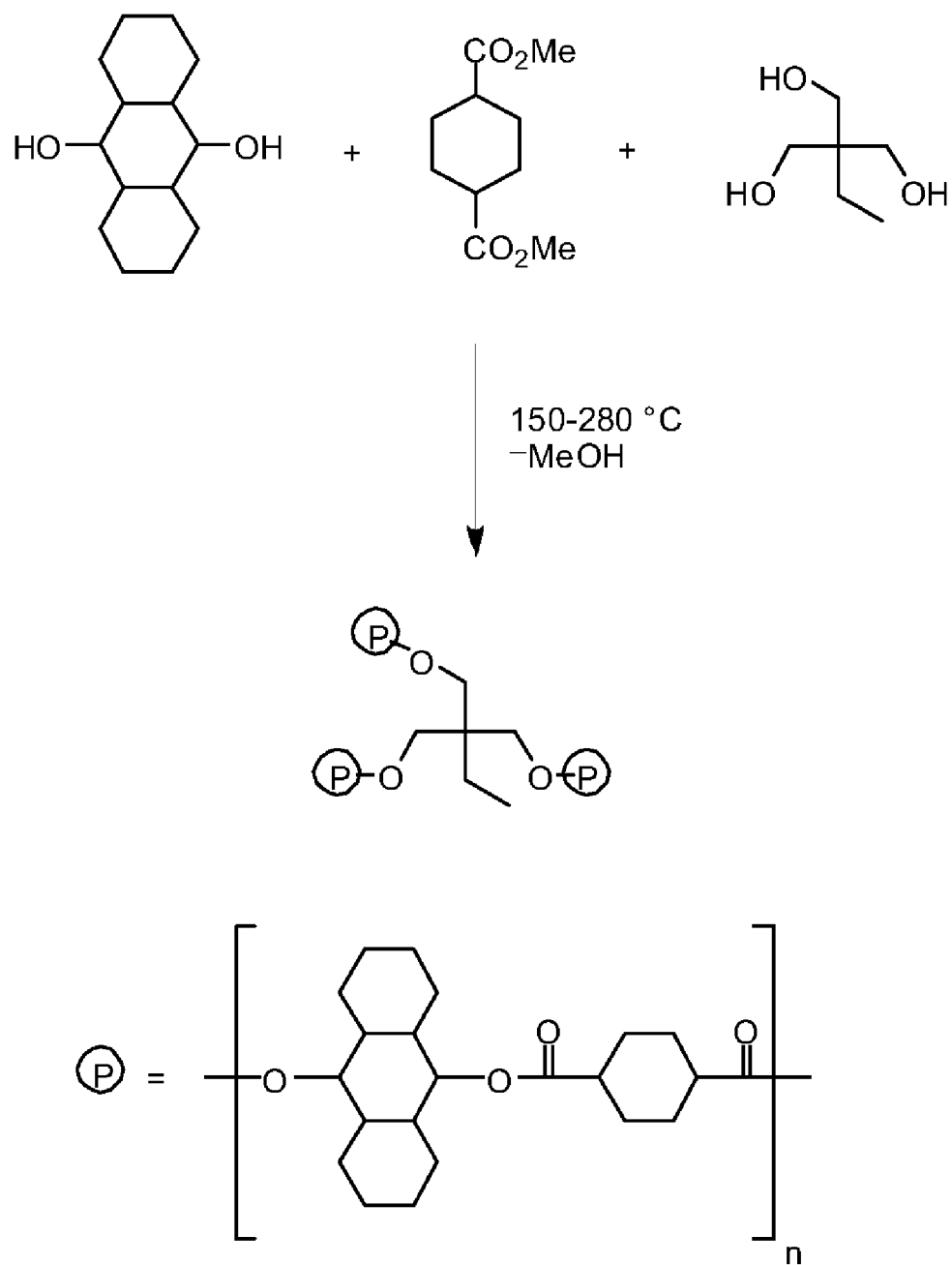
FIG. 9 is a schematic illustration of the synthesis of a polyester from TDHA-9,10-diol, 1,4-cyclohexanedicarboxylic acid dimethyl ester, and trimethylolpropane monomers.

Polyesters may be prepared by a number of methods, including the reaction of TDHA-9,10-diol with a dicarboxylic acid or derivative thereof. The polyesters may further include additional diol monomers and/or additional dicarboxylic acid (or dicarboxylic acid derivative) monomers. As shown in FIG. 9, branched polyesters may be prepared via the reaction of TDHA-9,10-diol with a diester and trimethylolpropane.

Polyurethanes may be prepared generally by the reaction of an alcohol (often a diol or triol) with an isocyanate (often a diisocyanate). Polyurethanes find a wide range of uses, such as foam and rubber cushioning materials. Coatings based upon polyurethanes exhibit exceptional abrasion resistance which may be attributed to hydrogen bonding associated with the carbamate motif present in polyurethanes. Low shrinkage polyurethanes may be employed as injection molding materials as well as adhesives. In some embodiments, the TDHA-based polyurethanes include a plurality of TDHA moieties, represented by Formula IX:

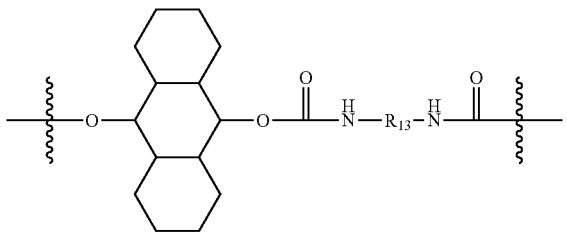

(IX)

where $R_{13}$ includes, but is not limited to, substituted or unsubstituted: alkylene, heteroalkylene, cycloalkylene, or arylene groups.

Figure 10:
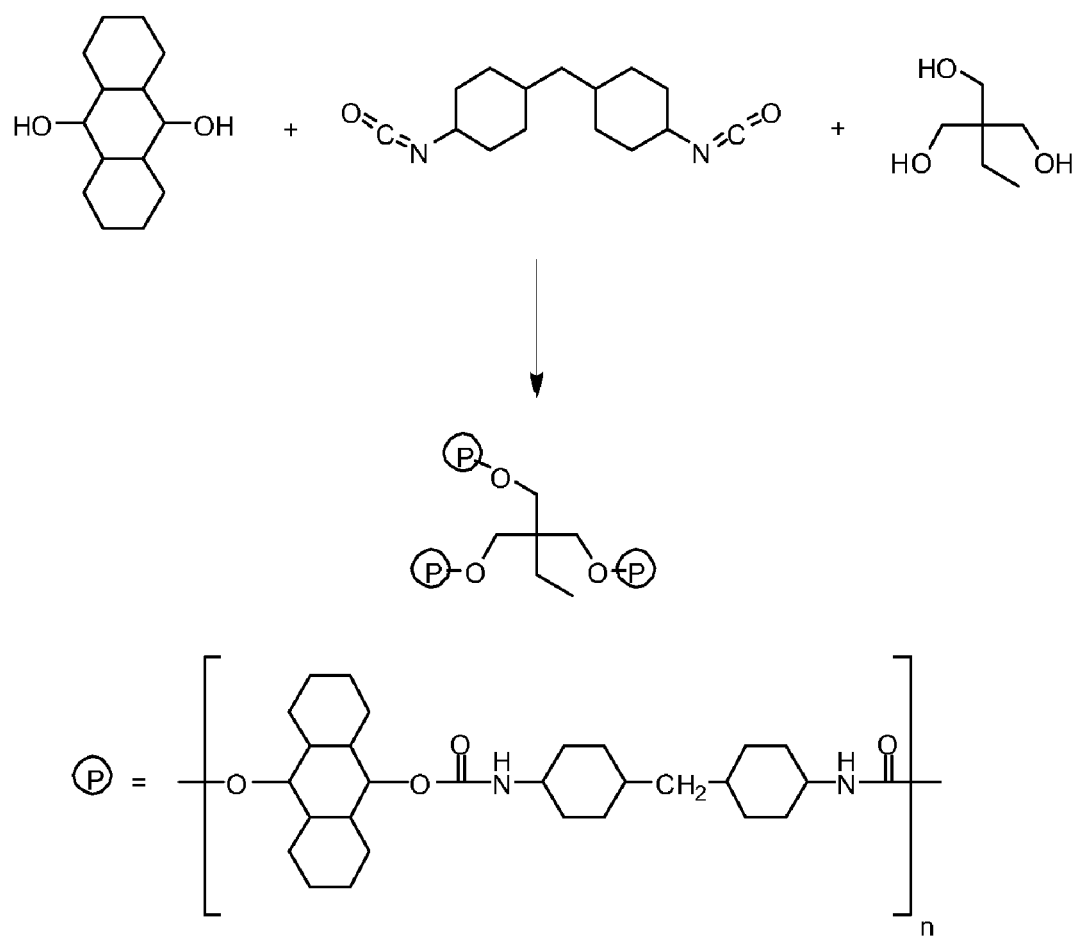
FIG. 10 is a schematic illustration of the synthesis of a polyurethane from TDHA-9,10-diol, 4,4'-methylenebis(cyclohexyl isocyanate), and trimethylolpropane monomers.
Figure 11:
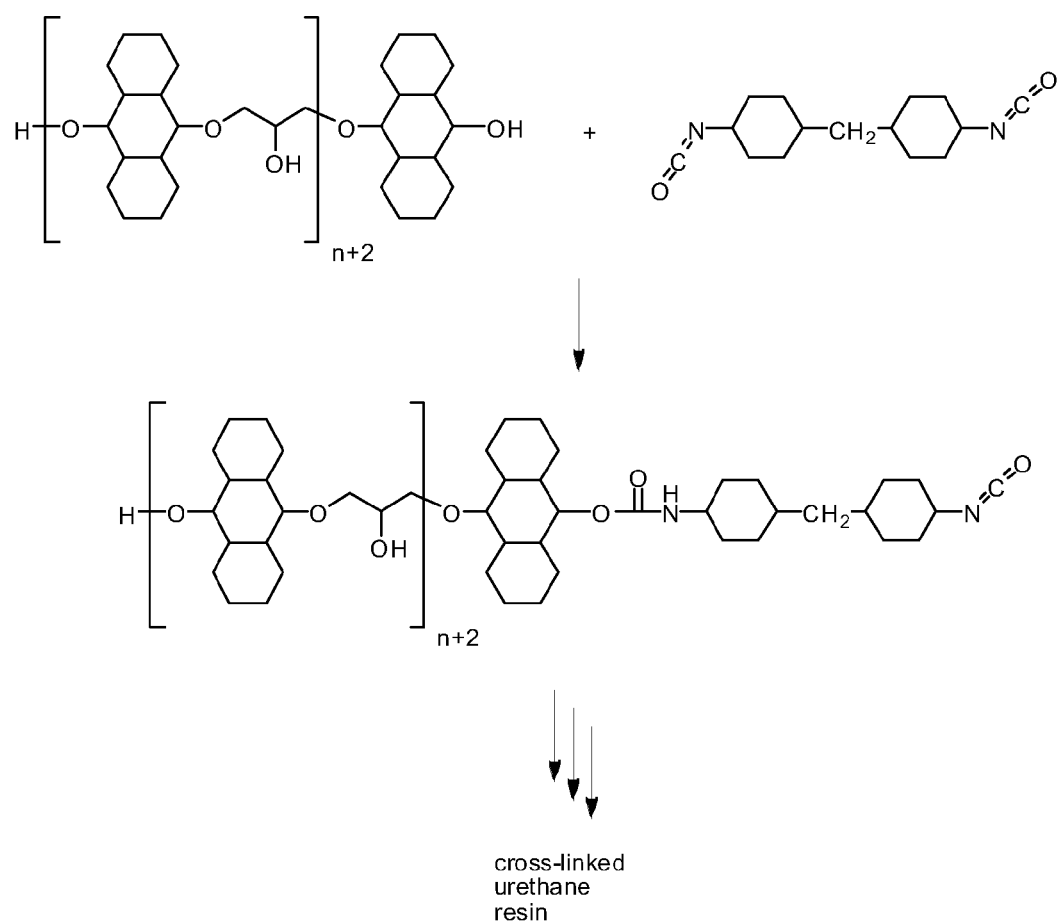
FIG. 11 is a schematic illustration of the synthesis of a cross-linked polyurethane resin suitable as a low toxicity, non-endocrine disrupting polymer for bottles and other applications.

Polyurethanes may be prepared by the reaction of TDHA-9,10-diol with a diisocyanate reagent. Non-limiting examples of diisocyanate reagents include methylene-bis(4-cyclohexylisocyanate), 2,2-propylene-bis(4-cyclohexylisocyanate), isophorone diisocyanate, hexamethylene diisocyanate, hexamethylene diisocyanate dimer, hexamethylene diisocyanate trimer, polyisocyanates, toluene diisocyanate, methylene-bis(4-phenylisocyanate), benzene diisocyanate, and cyclohexane diisocyanate. Polyurethanes may include other hydroxyl-containing monomers, in addition to TDHA-9,10-diol. For example, as shown in FIG. 10, a triol may be used in addition to TDHA-9,10-diol. Similarly, multiple diisocyanate reagents may also be used. In addition to preparing polyurethanes from TDHA-9,10-diol, other TDHA-containing materials may be used, such as polyols which contain the TDHA moiety. For example, as shown in FIG. 11, hydroxyl-terminated polyols including the TDHA moiety may be cross-linked with a reagent such as methylene-bis(4-cyclohexylisocyanate) to provide polymeric articles.

Any of the TDHA-containing polymers described may participate in grafting reactions to provide grafted copolymers. Such grafted polymers may be used as non-toxic and non-endocrine-disrupting coatings for interior linings of food and beverage containers. Such grafted resins may be based upon TDHA-containing polyols or epoxide resins, such as those shown in FIGS. 4-5. In one embodiment, the polymers include at least one graft side chain, where the graft side chain includes a polyacrylate, a polyolefin, or a copolymer thereof. The polyacrylate may be derived from an substituted or unsubstituted acrylate monomer such as acrylic acid, methacrylic acid, an acrylic acid ester, a methacrylic acid ester, or mixtures of any two or more thereof. Examples of acrylic monomers include: acrylic acid, methacrylic acid, methyl acrylate, ethyl acrylate, phenyl acrylate, butyl acrylate, 2-ethylhexyl acrylate, isobornyl acrylate, 2-hydroxyethyl acrylate, 2-hydroxypropyl acrylate, 2-chloroethyl acrylate, allyl acrylate, methyl methacrylate, ethyl methacrylate, butyl methacrylate, 2-ethylhexyl methacrylate, phenyl methacrylate, isobornyl methacrylate, 2-hydroxyethyl methacrylate, 2-hydroxypropyl acrylate, 2-chloroethyl methacrylate, allyl methacrylate, vinyl methacrylate, cyclohexyl methacrylate, and the like. The term "polyacrylate" includes polymethacrylate polymers. The polyolefin may be derived from vinyl monomers. Vinyl monomers include monomers such as styrene, α-methylstyrene, butadiene, ethylene, propylene, vinyl chloride, vinylidene chloride, vinyl acetate, vinyl ether, vinyl fluoride, vinylidene fluoride, and the like. The polyolefin may further be a copolymer of multiple vinyl monomers. The graft side chain may further include copolymers of acrylate and vinyl monomers.

The graft side chain may be emplaced with the aid of a free-radical initiator such as benzoyl peroxide or other initiator commonly known in the art. The acrylate monomers and/or vinyl monomers are chosen to impart desirable properties on the graft side chain (and thus to the grafted TDHA-based polymer). For example, glassy monomers such as methyl methacrylate or styrene provide hardness to the resulting resin, while rubbery moieties such as butyl acrylate provide flexibility. The graft side chain may be cross-linkable. For example, the graft side chain may be derived from monomers such as hydroxyethyl methacrylate to provide functionality for cross-linking the polymer.

Figure 6:
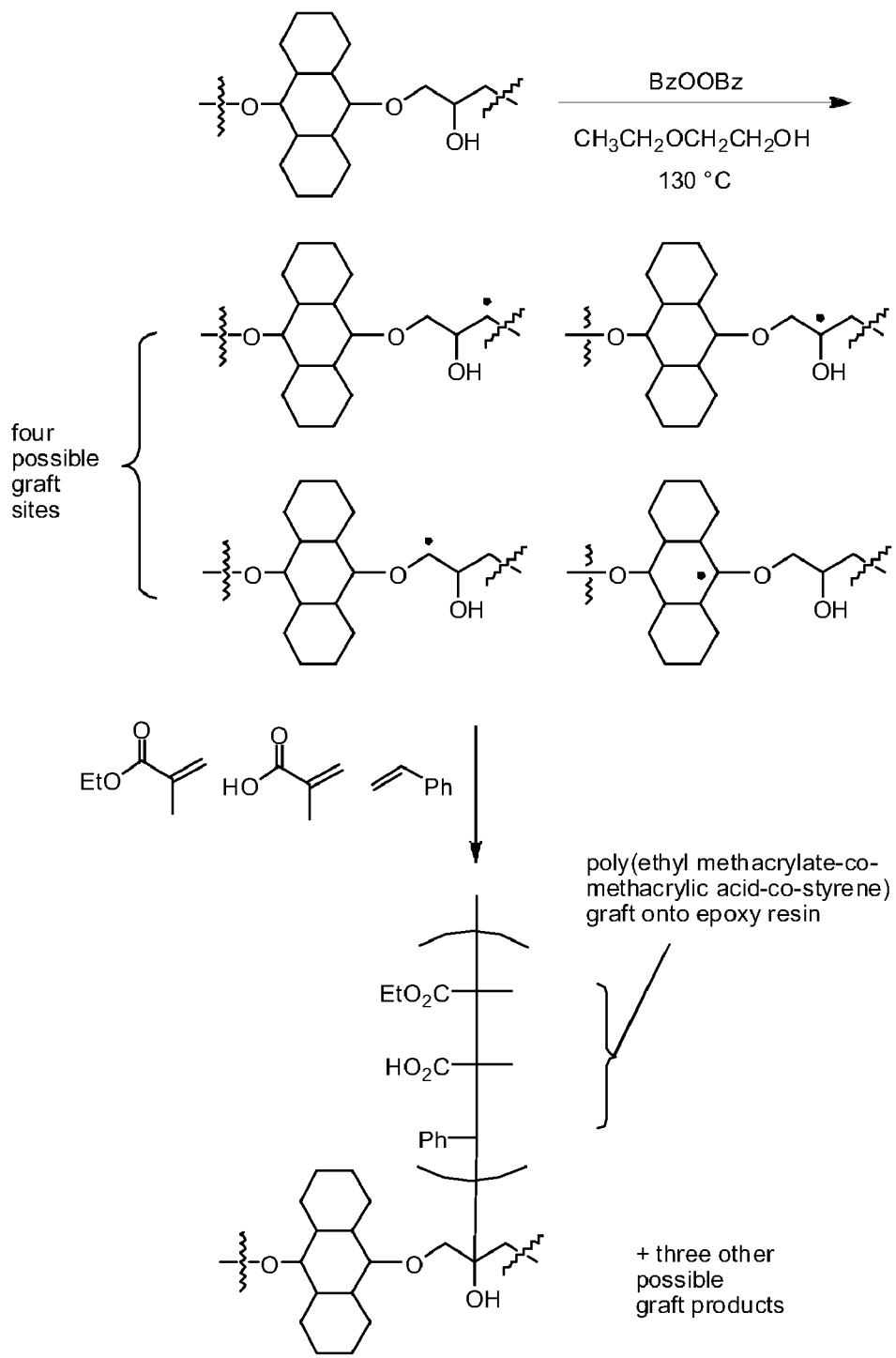
FIG. 6 is a schematic illustration of the synthesis of grafted TDHA-9,10-diol/epichlorohydrin resin for can coatings.
Figure 7:
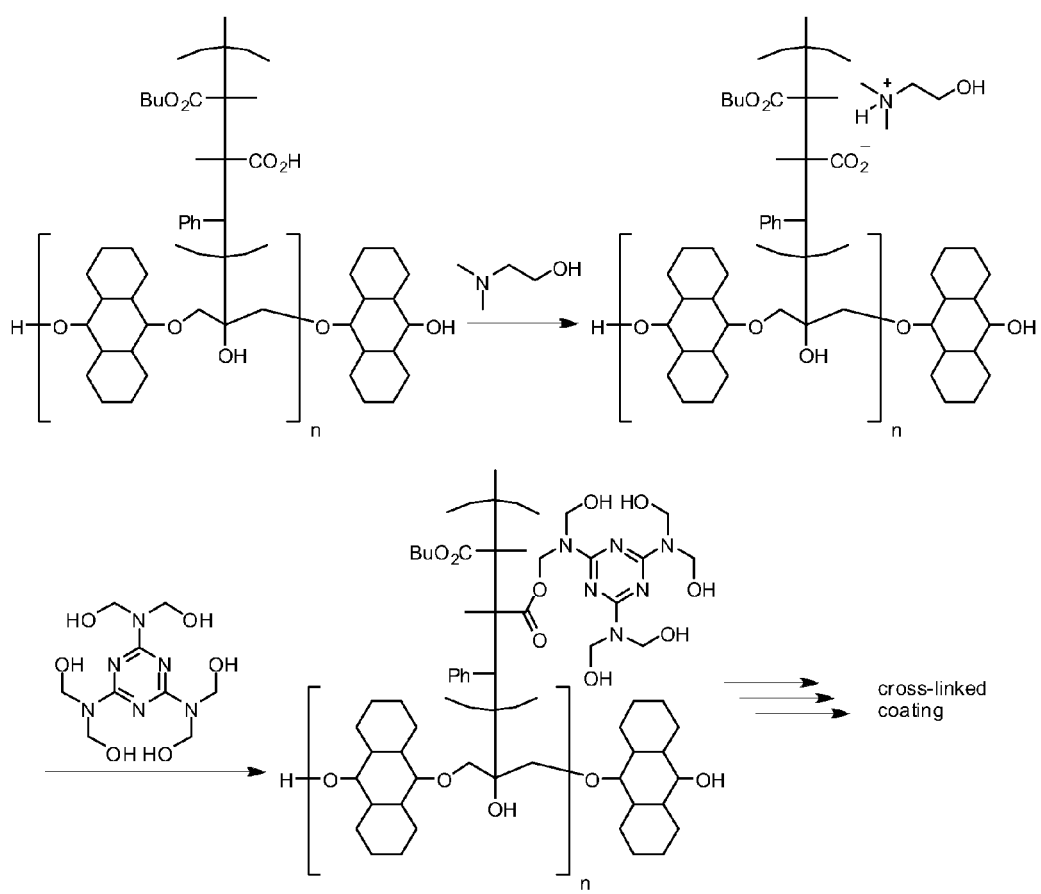
FIG. 7 is a schematic illustration of the synthesis of cross-linked grafted resins containing TDHA moieties.

FIG. 6 shows a schematic of an illustrative embodiment of the placement of a graft side chain of vinyl and acrylate monomers onto an TDHA-containing polymer (i.e., a TDHA-containing polyol or epoxy). The graft side chain will be preferentially incorporated at the sites of the α-hydrogen atoms. As shown in FIG. 7, grafted TDHA-containing epoxy resins with functional grafts may be prepared which can be further cross-linked with melamine-formaldehyde through the functional graft. Thus, in some embodiments, a polymer is provided which includes a plurality of TDHA moieties represented by Formula X:

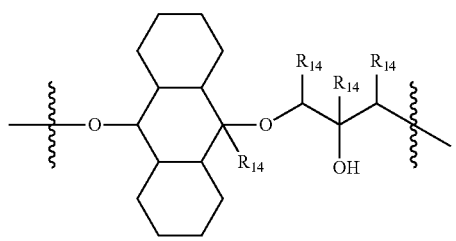

(X)

where $R_{14}$ may be independently at each occurrence a hydrogen atom, a polyacrylate, a polyolefin, or a copolymer of an acrylate monomer and a vinyl monomer.

As will be appreciated by those skilled in the art, in addition to numerous polymer compositions provided herein, a variety of methods to prepare TDHA-based polymers are also provided. In one regard, a method of preparing a first polymer including a plurality of TDHA moieties is provided, by hydrogenating a second polymer including a plurality of anthracene moieties. In some embodiments, the TDHA moieties of the first polymer are represented by Formula II:

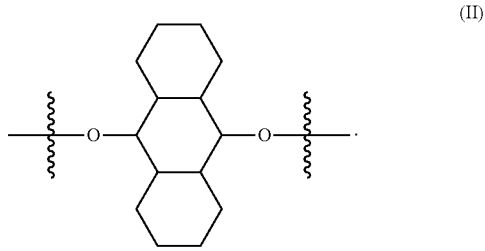

(II)

In other embodiments, the anthracene moieties of the second polymer are represented by Formula XI:

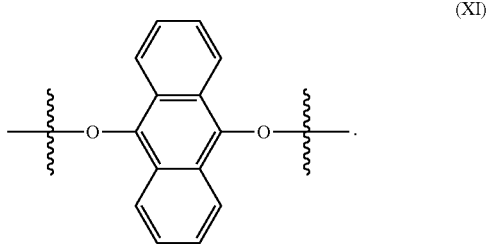

(XI)

In some other embodiments, the method provides a first polymer represented by the Formula III:

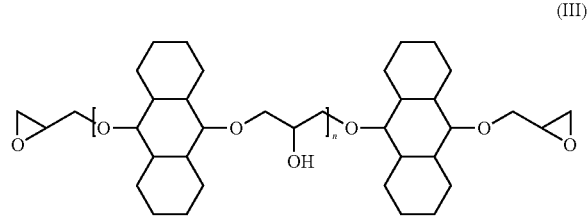

(III)

where n is an integer from 1 to 1,000,000.

In another aspect, containers and medical devices made from TDHA-based polymers are provided for use in food, beverage, and medical applications. The TDHA-based containers have the advantage of being non-endocrine disruptive and less (or non-) toxic in comparison to BPA-based containers. Representative containers include medical vials, medical sample containers, NALGENE® bottles, food containers and food storage containers, baby bottles, beverage containers, and plastic cups.

Rigid containers may be produced by an injection molding process of a TDHA-based polymer. Alternatively, TDHA-based containers may be obtained by hydrogenation of solid containers made of anthracene-based polymers, using a catalyst and hydrogen.

In a further aspect, coating materials are provided for food and beverage containers and for medical devices, where the coating materials include a polymer which includes at least one repeating unit, and the repeating unit includes TDHA moiety.

The present technology, thus generally described, will be understood more readily by reference to the following Examples, which are provided by way of illustration and are not intended to be limiting of the present technology.

EXAMPLES

Example 1

Epoxy Polymers

Lower molecular weight epoxies may be prepared directly from TDHA-9,10-diol diglycidyl ether. TDHA-9,10-diol diglycidyl ether may be prepared as shown in FIG. 2. In particular, to a clean and dry round bottom flask fitted with a condenser, addition funnel, argon inlet, and stir bar is added anhydrous THF followed by 1 equivalent of TDHA-9,10-diol while under argon. To the solution is slowly added sodium hydride (60 wt % dispersion in mineral oil, 2.1 equivalents). Bubbles form vigorously. Once bubble formation has ceased, the disodium alkoxide is cannulated to a solution of epichlorohydrin in dry THF. The resultant solution is stiffed for 24 hours, during which time a white precipitate (NaCl) forms. Water is added after the reaction is complete. TDHA-9,10-diol diglycidyl ether is isolated by extraction into methylene chloride, rotary evaporation and purification on silica. TDHA-9,10-diol diglycidyl ether is isolated in yields greater than 80%.

TDHA-9,10-diol diglycidyl ether may be cured with an amine to form coating materials. For example, TDHA-9,10-diol diglycidyl ether (100 g) is diluted with methyl acetate (6.0 g), tert-butyl acetate (8.0 g), and p-chlorobenzotrifluoride (6.9 g). To this mixture is added triethylene tetraamine (40.8 g). The solution is allowed to stand (induct) for 20 minutes. The solution is the sprayed on tin-coated steel plates and heated to 90° C. for 15 minutes which cures the coating on the metal surface.

Higher molecular weight epoxy resins containing the TDHA moiety may be prepared by hydrogenation of higher molecular weight anthracene-9,10-diol-based epoxy resins followed by hydrogenation. FIG. 3 illustrates the synthesis of an anthracene-9,10-diol-based epoxy resin. In this process, linear polymers with high levels of hydroxyl functionality may be prepared. In particular, reaction of anthracene-9,10-diol diglycidyl ether (prepared via a known alkylation reaction of anthracene-9,10-diolate anion with epichlorohydrin) with anthracene-9,10-diol under basic conditions provides the higher molecular weight epoxy resin of anthracene-9,10-diol terminated with glycidyl ether moieties. This epoxy resin may be hydrogenated under mild conditions ($H_2$, 3 atm, 150° C., catalyst (e.g., Pd/C)) to provide the corresponding TDHA-containing epoxy resin, as shown in FIG. 4. In a fashion similar to that described in the preceding paragraph, this higher molecular weight TDHA-containing resin may be cross-linked with an amine such as triethylene tetraamine and used as a coating material.

Example 2

Polyols and Alkyds

As shown in FIG. 5, alkyd resins may be prepared from the higher molecular weight glycidyl ether terminated anthracene-9,10-diol epoxy resin shown in FIG. 3. In particular, the unsaturated, epoxy-terminated resin is first end-capped with anthracene-9,10-diol under basic conditions, then hydrogenated in a manner similar to that previously described to provide a TDHA-containing polyol.

The alkyd resins are prepared via reaction of the TDHA-containing polyol with a fatty acid, such as linoleic acid. A representative procedure is as follows. A reaction vessel is charged with the TDHA-containing polyol and linoleic acid is added under nitrogen. To this mixture is added 5 wt % xylene, and, optionally, a catalyst such as p-toluenesulfonic acid, tetraisopropyl titanate, lithium hydroxide, or zirconium-, zinc-, calcium-, ferrous-, or lithium ricinoleate. The reaction vessel is equipped with a Dean Stark trap and the mixture heated to 230° C. Water produced during the course of the reaction is removed by the water-xylene azeotrope. The reaction is continued until the acid value of the alkyd resin is below 5 mg KOH/g.

The aforementioned alkyd resin may be used as a coating material. For example, the alkyd resin (100 g) may be charged to a reaction vessel and solvents added (acetone, methyl acetate, tert-butyl acetate, and p-chlorobenzotrifluoride) to form a solution. A catalytic drier mixture including zirconium octoate (13%), calcium octoate (5%), and cobalt octoate (1%) in mineral spirits is carefully added to the alkyl resin solution with stirring. The resin is then applied to tin plated steel at a thickness of 2 mils and baked at 120° C. for 30 minutes to form the coating.

Example 3

Graft Coatings

Water reducible graft polymer coatings derived from TDHA-containing polymers may be prepared as non-toxic and non-endocrine disrupting resins for interior linings for food and beverage containers. The graft polymer coatings are prepared from any of the TDHA-containing polymers, including the higher molecular weight TDHA-9,10-diol/epichlorohydrin epoxy resin (Example 1), or the TDHA-containing polyol (Example 2). The pendent side chain or graft is a polymer of vinylic and/or acrylic monomers, including but not limited to acrylics, styrenics, vinyl carboxylic acids (vinyl acetate), vinyl chloride, or other vinyl containing moiety. Combinations of vinyl or acrylic monomers may be used. The graft polymer is grown using a free radical initiator such as benzoyl peroxide, but a variety of initiator types work equally well (e.g., azo initiators such as AIBN). The monomer moieties are chosen to impart particular properties on the graft polymer. Glassy moieties such as methyl methacrylate or styrene provide hardness to the resulting resin while rubbery moieties such as butyl acrylate provide flexibility. Other monomer moieties such as hydroxyethyl methacrylate provide functionality to cross-link the polymer.

FIG. 6 shows the preparation of grafted resins from the higher molecular weight TDHA-9,10-diol/epichlorohydrin-based epoxy resins prepared from Example 1. The epoxy resins need not be terminated with epoxy groups; the terminal moieties may be other groups such as hydroxyl (e.g., the TDHA-containing polyols from Example 1) or hydrogen. Treatment of higher molecular weight TDHA-9,10-diol/epichlorohydrin-based epoxy resin with benzoyl peroxide initiator generates a variety radical intermediates, each which may participate in grafting with vinyl and/or acrylic monomers (grafting with ethyl methacrylate, methacrylic acid, and styrene is shown in FIG. 6.)

A representative procedure for the preparation of a grafted resin from the TDHA-containing polyol prepared in Example 2 is as follows. The TDHA polyol is dissolved into ethyl cellosolve and the solution heated to 120° C. under nitrogen. To the polyol is added a solution of benzoyl peroxide, followed by butyl methacrylate, methacrylic acid, and styrene in a drop-wise fashion. The solution is heated to 130° C. for 2 hours. The resulting resin is a mixture of grafted acrylic-styrenic polymer on the polyol resin as shown in FIG. 7 (only one graft point of four possible sites shown; see FIG. 6) along with ungrafted acrylic-styrenic polymer and unreacted polyol resin. The solution is then cooled to 95° C. A mixture of 2-(dimethylamino)ethanol and water is added drop-wise to neutralize the grafted polyol resin. The grafted polyol resin may be cross-linked with a variety of cross-linking agents such as melamine-formaldehyde resin (shown in FIG. 7), epoxy resins, alcohols, or itself. The resultant dispersion may be spray applied to a surface. The coating is then baked to remove solvents and cross-link the polymer. Baking temperatures will depend upon the type of cross-linking agent used. Typically such temperatures are between 120 and 180° C.

Example 4

Polycarbonates

Polycarbonates may be readily prepared from TDHA-9,10-diol, as illustrated by the following procedure. To a three-necked glass reactor equipped with mechanical stirrer, nitrogen inlet, and a distillation system, is added TDHA-9,10-diol along with a slight excess of diphenyl carbonate (FIG. 8). The mixture is heated to 200° C. and to the molten mixture is added zinc acetate dihydrate (extra pure). The system is allowed to dimerize for 45 minutes at which time the pressure in the reactor is reduced to 20 mmHg to remove phenol. After 60 minutes, the temperature is increased from 200° C. to 260° C. The reactor pressure is further reduced to 1 mmHg and the reaction is completed by heating for additional 2 hours at 260° C. under vacuum. The final polymer melt is cooled under vacuum to room temperature, then optionally dissolved in chloroform and precipitated drop-wise from the solution into methanol. The polycarbonate thus obtained is dried under reduced pressure at 100° C. overnight.

Example 5

Polyesters

Polyesters may be prepared from TDHA-9,10-diol according to the following representative procedure as further illustrated in FIG. 9. 1,4-Cyclohexanedicarboxylic acid dimethyl ester, (46.1 g, 0.46 mol), is added to a glass reaction vessel fitted with a mechanical stirrer, thermometer, condenser, nitrogen inlet, and vacuum inlet. To the vessel is added TDHA-9,10-diol (39.3 g, 0.35 mol), trimethylolpropane (5.0 g, 0.11 mol), and zinc acetate dihydrate (0.1 g, extra pure). The mixture is heated to 150° C. under nitrogen and methanol is removed via distillation. Once dimerization is complete, the system is placed under vacuum and heated to 280° C. and the reaction allowed to proceed until the hydroxyl number is 3.2 mg KOH. Carrying the reaction to a lower hydroxyl value creates a highly cross-linked poly carbonate network.

Example 6

Polyurethanes

Polyurethanes may be prepared from TDHA-9,10-diol according to the following representative procedure as further illustrated in FIG. 10. TDHA-9,10-diol (12.2 g, 0.11 mol) is added to a reaction vessel, along with trimethylolpropane (2.3 g, 0.05 mol), methyl acetate (2.8 g), tert-butyl acetate (6.0 g), and p-chlorobenzotrifluoride (3.2 g). To the solution is added 4,4'-methylenebis(cyclohexyl isocyanate) (23.6 g, 0.18 mol NCO) and dibutyltin dilaurate (0.1 g). The solution is allowed to induct for 30 minutes and the pre-polymer solution is applied to pre-treated and sealed wood and heated to 120° C. for 20 minutes to form a cross-linked coating. At room temperature, the polyurethane coating cures overnight.

As shown in FIG. 11, urethane polymers may also be prepared from TDHA-containing polymers, such as the polyol prepared in Example 2. The TDHA-containing polyol (100 g) added to a flask and heated to 35° C. To the polyol is added 4,4'-methylenebis(cyclohexyl isocyanate) (40 g) and the two components are mixed to form a viscous liquid. Bubbles formed during the mixing process are removed. The liquid is then injected under pressure into a circular mold and heated to 150° C. for 1 hour. The resultant polyurethane circular object is tough and durable.

EQUIVALENTS

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Similarly, the phrase "at least about" some value such as, e.g., wt % includes at least the value and about the value. For example "at least about 1 wt %" means "at least 1 wt % or about 1 wt %." Finally, as will be understood by one skilled in the art, a range includes each individual member.

Other embodiments are set forth in the following claims.

What is claimed is:

1. A polymer comprising at least one repeating unit, wherein the repeating unit comprises a tetradecahydroanthracene moiety represented by Formula I:

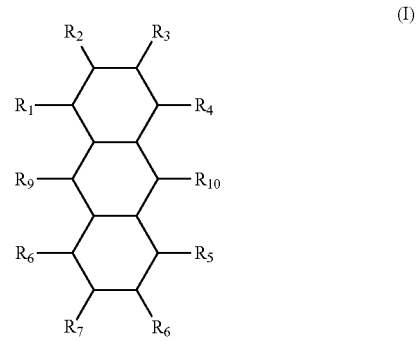

wherein:
$R_1$-$R_4$ and $R_5$-$R_{10}$ are hydrogen and $R_9$-$R_{10}$ are oxo groups; and
the tetradecahydroanthracene moiety is part of to the polymer backbone through the oxo groups.

2. The polymer of claim 1, wherein the polymer comprises an epoxy, a polyol, an alkyd, a polycarbonate, a polyester, or a polyurethane.

3. The polymer of claim 1, wherein the polymer comprises a plurality of tetradecahydroanthracene moieties each represented by Formula II:

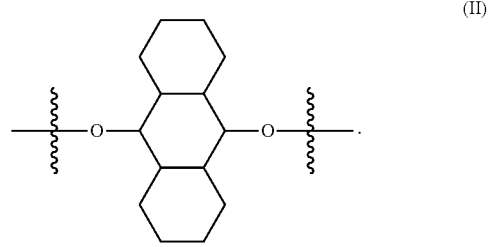

4. The polymer of claim 1, wherein the polymer comprises a plurality of tetradecahydroanthracene moieties represented by Formula VI:

stearic acid, palmitic acid, oleic acid, linoleic acid, linolenic acid, ricinolenic acid, eleostearic acid, eicosapentaenoic acid, docosahexaenoic acid, stearidonic acid, eicosatrienoic acid, eicosatetraenoic acid, docosapentaenoic acid, clupanodonic acid, tetracosapentaenoic acid, and tetracosahexaenoic acid; and
wherein n is an integer from 1 to 1,000,000.

11. The polymer of claim 1, wherein the polymer comprises a plurality of tetradecahydroanthracene moieties represented by Formula VII:

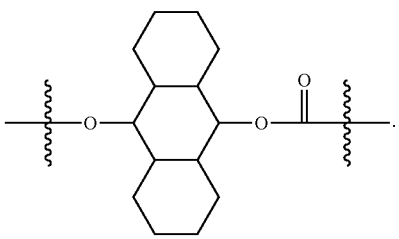

(VII)

12. The polymer of claim 1, wherein the polymer is a polyester comprising a plurality of tetradecahydroanthracene moieties represented by Formula VIII:

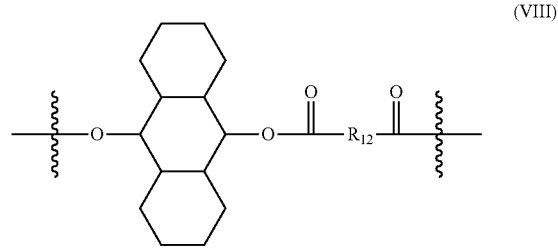

(VIII)

wherein $R_{12}$ is alkylene, cycloalkylene, or arylene.

13. The polymer of claim 1, wherein the polymer is a polyurethane which is cross-linked by an diisocyanate agent selected from the group consisting of methylene-bis(4-cyclohexylisocyanate), 2,2-propylene-bis(4-cyclohexylisocyanate), isophorone diisocyanate, hexamethylene diisocyanate, hexamethylene diisocyanate dimer, hexamethylene diisocyanate trimer, polyisocyanates, toluene diisocyanate, methylene-bis(4-phenylisocyanate), benzene diisocyanate, and cyclohexane diisocyanate.

14. The polymer of claim 1, wherein the polymer is a polyurethane comprising a plurality of tetradecahydroanthracene moieties represented by Formula (IX):

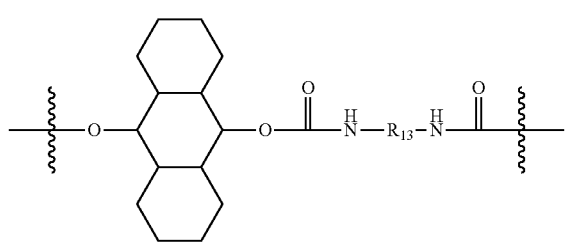

(IX)

wherein $R_{13}$ is selected from the group consisting of alkylene, cycloalkylene, or arylene.

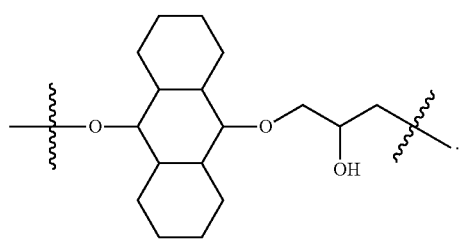

(VI)

5. The polymer of claim 1 represented by Formula III:

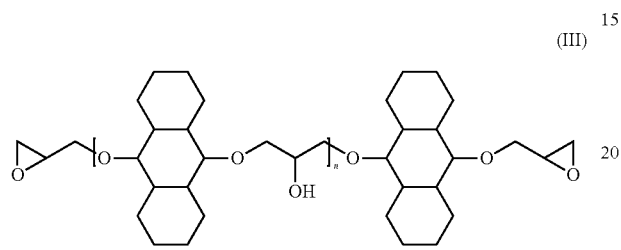

(III)

wherein n is an integer from 1 to 1,000,000.

6. The polymer of claim 1, wherein the polymer comprises a cross-linked epoxy.

7. The polymer of claim 1, wherein the polymer comprises an epoxy which is cross-linked by an amine, a diamine, a triamine, a tetraamine, an alcohol, a diol, a triol, or a tetraol.

8. The polymer of claim 1 is represented by Formula IV:

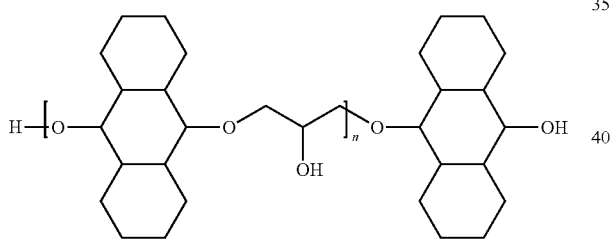

(IV)

wherein n is an integer from 1 to 1,000,000.

9. The polymer of claim 1, wherein the polymer is an alkyd comprising an esterified polyol backbone comprising a plurality of tetradecahydroanthracene moieties; and a plurality of fatty acid side chains attached to the esterified polyol backbone through ester linkages.

10. The polymer of claim 1 represented by Formula V:

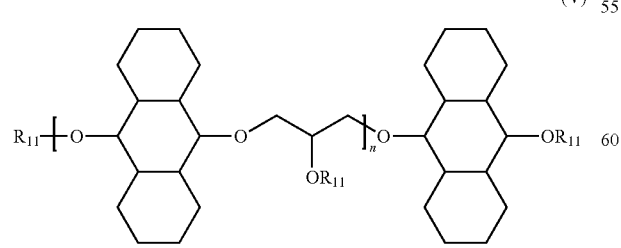

(V)

wherein $R_{11}$ is independently at each occurrence a fatty acid selected from the group consisting of lauric acid, 15. The polymer of claim 1, wherein the polymer is a random copolymer, a block copolymer, or a graft copolymer.

16. The polymer of claim 1, wherein the polymer further comprises at least one graft side chain, wherein the graft side chain comprises a polyacrylate, a polyolefin, or a copolymer thereof.

17. The polymer of claim 16, wherein the polyacrylate comprises acrylate monomers selected from the group consisting of acrylic acid, methacrylic acid, acrylic acid esters, and methacrylic acid esters.

18. The polymer of claim 16, wherein the polyolefin comprises vinyl monomers selected from the group consisting of styrene, α-methylstyrene, butadiene, ethylene, propylene, vinyl chloride, vinylidene chloride, vinyl acetate, vinyl ether, vinyl fluoride, and vinylidene fluoride.

19. The polymer of claim 1, wherein the polymer comprises a plurality of tetradecahydroanthracene moieties represented by Formula X:

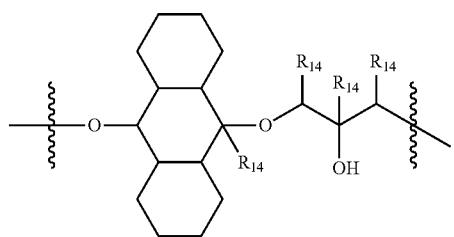

(X)

wherein $R_{14}$ is independently at each occurrence selected from the group consisting of hydrogen, a polyacrylate, a polyolefin, and a copolymer of an acrylate monomer and a vinyl monomer.

20. A method of preparing a first polymer comprising a plurality of tetradecahydroanthracene moieties of claim 1, the method comprising:

hydrogenating a second polymer comprising a plurality of anthracene moieties.

21. The method of claim 20, wherein the tetradecahydroanthracene moieties are represented by Formula II:

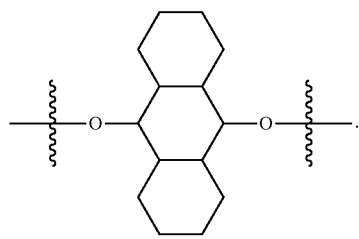

(II)

22. The method of claim 20, wherein the anthracene moieties are represented by Formula XI:

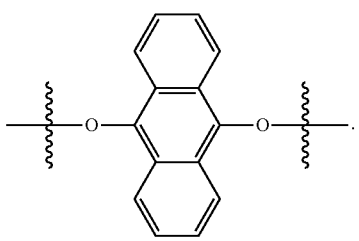

(XI)

23. The method of claim 20, wherein the first polymer is represented by Formula III:

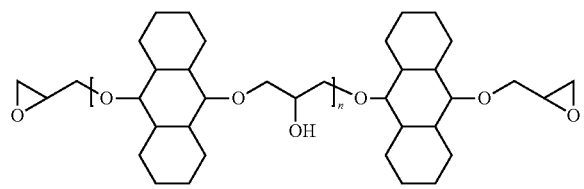

(III)

wherein n is an integer from 1 to 1,000,000.

24. An article comprising the polymer of claim 1, wherein the article is a food container, a beverage container, or a medical device.

* * * * *

UNITED STATES PATENT AND TRADEMARK OFFICE
CERTIFICATE OF CORRECTION

| | |
|---|---|
| PATENT NO. | : 8,227,561 B1 |
| APPLICATION NO. | : 13/318098 |
| DATED | : July 24, 2012 |
| INVENTOR(S) | : Carlson et al. |

It is certified that error appears in the above-identified patent and that said Letters Patent is hereby corrected as shown below:

On Title Page 2, Item (56), under "OTHER PUBLICATIONS", Line 27, delete "bioabsorable" and insert -- bioabsorbable --, therefor.

In Column 5, Line 49, delete "–$CH_2$≡C≡CH," and insert -- –$CH_2$C≡CH, --, therefor.

In Column 14, Line 12, delete "an" and insert -- a --, therefor.

In Column 14, Line 48, delete "an" and insert -- a --, therefor.

In Column 16, Line 26, delete "stiffed" and insert -- stirred --, therefor.

In Column 20, Line 45, in Claim 1, delete "of to" and insert -- of --, therefor.

Signed and Sealed this
Sixth Day of November, 2012

David J. Kappos
*Director of the United States Patent and Trademark Office*